US007619978B2

(12) United States Patent
Imazeki

(10) Patent No.: US 7,619,978 B2
(45) Date of Patent: Nov. 17, 2009

(54) TRANSMISSION STATE INDICATING SYSTEM INDICATING POINTER VALUES FOR EVALUATING TRANSMISSION STATE OF COMMUNICATION NETWORK HAVING A PLURALITY OF CHANNELS AT THE SAME TIME CORRESPONDING TO THE RESPECTIVE CHANNELS

(75) Inventor: Hajime Imazeki, Isehara (JP)

(73) Assignee: Anritsu Corporation, Atsugi-shi (JP)

( * ) Notice: Subject to any disclaimer, the term of this patent is extended or adjusted under 35 U.S.C. 154(b) by 778 days.

(21) Appl. No.: 10/806,819

(22) Filed: Mar. 22, 2004

(65) Prior Publication Data

US 2004/0190561 A1 Sep. 30, 2004

(30) Foreign Application Priority Data

Mar. 24, 2003 (JP) ............................. 2003-080520

(51) Int. Cl.
*H00J 3/04* (2006.01)
*H04L 12/26* (2006.01)
(52) U.S. Cl. ...................................... 370/241; 370/535
(58) Field of Classification Search ................. 370/389, 370/392, 394, 474, 506, 521, 241, 242, 535–537
See application file for complete search history.

(56) References Cited

U.S. PATENT DOCUMENTS

| 5,461,622 | A | 10/1995 | Bleickardt et al. | |
| 5,572,515 | A | 11/1996 | Williamson et al. | |
| 5,754,437 | A | * | 5/1998 | Blazo ........................... 702/75 |
| 7,013,243 | B2 | 3/2006 | Koizumi et al. | |
| 2001/0008536 | A1* | 7/2001 | Kibe ........................... 370/537 |
| 2002/0080812 | A1 | 6/2002 | Stadler et al. | |
| 2002/0167912 | A1* | 11/2002 | Melville et al. ............... 370/252 |
| 2003/0012188 | A1* | 1/2003 | Zelig et al. ................... 370/389 |

FOREIGN PATENT DOCUMENTS

DE 199 03 366 A1 8/2000

| EP | 1 119 127 A2 | 7/2001 |
| EP | 1 249 953 A1 | 10/2002 |
| JP | 2000-036802 A | 2/2000 |
| WO | WO 01/95536 A1 | 12/2001 |

OTHER PUBLICATIONS

"SDHP/PDH-Messwillinge Unter Einem Hut" Telecom Report, Siemens Ag. Munchen, DE, vol. 18, No. 2, Mar. 1, 1995, XP000510939,ISSN: 0344-4724.
"Signalwizard: all-channel testing technology (SONET)" Product Note (Agilent) May 1, 2001, XP002178308.
ITU-T G.707 Series G: Transmission Systems and Media, Digital Systems and Networks; International Telecommunication Union; Mar. 2001; pp. 1-12.
ITU COM 15-R 71-E; Report of Working Party 3/15,Multiplexing and Switching; Study Group 15; May 2000; pp. 1-166.

* cited by examiner

*Primary Examiner*—Kevin C Harper
*Assistant Examiner*—Wanda Z Russell
(74) *Attorney, Agent, or Firm*—Frishauf, Holtz, Goodman & Chick, P.C.

(57) ABSTRACT

High capacity data is divided into the plurality of low capacity virtual containers and transmitted via the plurality of channels which configure a communication network based on clocks at the respective channels. A multiplexed frame acquiring unit acquires a multiplexed frame in which mapping, accompanying delay absorption processings corresponding to transmission states at respective channels, has been carried out based on a reference clock with respect to the virtual containers at the respective channels included in a plurality of frames including the plurality of low capacity virtual containers. A pointer value detecting unit successively detects a plurality of pointer values for respectively evaluating transmission states at the plurality of channels which configure the communication network, and successively corrects the plurality of pointer values based on variations in phases at the respective channels to be detected from phase differences between the clocks at the respective channels and the reference clock. A display unit indicates the plurality of pointer values at the same time, corresponding to the plurality of channels.

20 Claims, 10 Drawing Sheets

TRANSMISSION STATE INDICATING SYSTEM INDICATING POINTER VALUES FOR EVALUATING TRANSMISSION STATE OF COMMUNICATION NETWORK HAVING A PLURALITY OF CHANNELS AT THE SAME TIME CORRESPONDING TO THE RESPECTIVE CHANNELS

CROSS-REFERENCE TO RELATED APPLICATIONS

This application is based upon and claims the benefit of priority from prior Japanese Patent Application No. 2003-80520, filed Mar. 24, 2003, the entire contents of which are incorporated herein by reference.

BACKGROUND OF THE INVENTION

1. Field of the Invention

The present invention relates to a transmission state indicating system, and in particular, to a transmission state indicating system indicating pointer values for evaluating a transmission state of a communication network which uses, for example, an SDH (Synchronous Digital Hierarchy) system or a SONET (Synchronous Optical Network) system and which has a plurality of channels, at the same time corresponding to the respective channels.

2. Description of the Related Art

Recently, in the field of digital transmission, in order to transmit high capacity data by effectively using an existing network, a technique called a virtual concatenation (Virtual Concatenation: ITU-T G. 707) has been standardized in which high capacity data are divided and contained into a plurality of low capacity virtual containers (Virtual Container: VC), and after the low capacity data contained in the plurality of virtual containers are separately transmitted to a plurality of channels, and the data is correctly assembled and multiplexed, and then transmitted to another high capacity channel.

In this case, the respective channels configuring the existing network have respectively different transmission capacities and different transmission distances. Therefore, in order to stably carry out data transmission by the virtual concatenation technique, it is important to grasp in advance the transmission delayed amounts at the respective channels and the amount of variations in phases due to phase differences between the clocks of the respective channels at the low capacity channel sides and a clock of the high capacity channel at the multiplexed side, as pointer values for evaluating the transmission state of the communication network having the plurality of channels.

However, with respect to an existing wire communication network using the SDH/SONET transmission system as the base, currently, no transmission state indicating system has been known in which the delayed amount at the times of transmissions at respective channels and the amount of variations in phases due to differences between the clocks of the respective channels at the low capacity channel side and the clock of the high capacity channel, as pointer values for evaluating the transmission state of the communication network.

Note that, with respect to a mobile communication system, as disclosed in Jpn. Pat. Appln. KOKAI Publication No. 2000-36802 which is Patent document 1, a transmission state indicating apparatus in which a strength of a received CDMA signal and respective channels are indicated by associating with one another has been known.

The SDH transmission system is described in ITU-T G. 707 or the like.

The SONET transmission system is described in ANSI TI. 105 or the like.

However, the transmission state indicating apparatus as disclosed in the Patent document 1 indicates a strength of a radio wave in a case of using a mobile communication system due to radio communication, and cannot be applied to a case of using a wire communication network.

Accordingly, there are the problems that not only it is impossible to distinguish the pointer values which are required when high capacity data is divided into a plurality of virtual containers and transmitted by digital transmission via a wire communication network having a plurality of channels such as the SDH/SONET transmission system or the like, and which are for evaluating the transmission state of the communication network having the plurality of channels, i.e., the effect on the performance of a receiving apparatus due to the amount of variations in phases and the delayed amount, but also it is impossible to grasp in advance how large they are.

Note that, when the high capacity data is divided into a plurality of frames respectively having the low capacity containers and transmitted by digital transmission via the wire communication network having a plurality of channels such as the SDH/SONET transmission system or the like, if the delayed amount at the time of transmission by the communication network having the plurality of channels is greater than or equal to a predetermined time, the plurality of low capacity virtual containers divided and transmitted cannot be correctly assembled and multiplexed so as to be the plurality of original frames at the reception side, and there is the possibility of obstructing the communication.

In accordance with the consideration of the inventor of the present application, there has been increased the demands for realizing a transmission state indicating system in which, in order to carry out stable data communication via an existing wire communication network having a plurality of channels using a transmission system by the virtual concatenation technique, for example, the SDH/SONET transmission system or the like, by indicating pointer values required for evaluating the transmission state of the communication network which includes the transmission delayed amount at the respective channels and the amounts of variations due to the phase differences between the clocks of the respective channels at the plurality of low capacity channel sides and the high capacity channel at the multiplexed side, in accordance with the respective channels, as pointer values for evaluating the transmission state of the communication network having the plurality of channels, the operator can visually verify the transmission states at the respective channels and can evaluate those.

BRIEF SUMMARY OF THE INVENTION

The present invention has been achieved in consideration of the above-described circumstances, and an object of the present invention is to provide a transmission state indicating system in which, in order to carry out stable data communication via an existing wire communication network having a plurality of channels which uses a transmission system by the virtual concatenation technique, for example, the SDH/SONET transmission system or the like, by indicating pointer values required for evaluating the transmission state of the communication network including the transmission delayed amounts at the respective channels and the amounts of variations in phases due to the phase differences between the clocks of the respective channels at the plurality of low capacity channel sides and the high capacity channel, at the same time, corresponding to the respective channels, as pointer values for evaluating the transmission state of the communication network having the plurality of channels, the operator can visually verify the transmission states at the respective channels and can evaluate those.

The gist of the present invention is to achieve a conspicuous effect in which, in order to carry out stable data communication via the existing wire communication network having a plurality of channels which use a transmission system by the virtual concatenation technique, for example, the SDH/SONET transmission system or the like, due to the apparatus being configured such that pointer values showing the transmission state of the communication network having the plurality of channels which includes the transmission delayed amount at the respective channels and the amounts of variations in phases due to the phase differences between the clocks of the respective channels at the plurality of low capacity channel sides and the high capacity channel are indicated, at the same time, corresponding to the respective channels, as pointer values for evaluating the transmission state of the communication network having the plurality of channels, the operator can visually verify the pointer values showing the transmission state of the communication network corresponding to the respective channels and can evaluate those.

In order to achieve the above object, according to a first aspect of the present invention, there is provided a transmission state indicating method comprising:

in accordance with a predetermined transmission system, high capacity data is divided into a plurality of low capacity virtual containers and transmitted via a plurality of channels (STM(1), STM(2), . . . , STM(n)) which configure a communication network (3) based on clocks at the respective channels, acquiring a multiplexed frame (STM-N) in which mapping, accompanying delay absorption processings corresponding to transmission states at the respective channels, has been carried out based on a reference clock with respect to virtual containers at the respective channels included in a plurality of frames including the plurality of low capacity virtual containers;

successively detecting factors at the respective channels which are respectively included in the plurality of frames included in the multiplexed frame, and which are to be objects for delay absorption processings corresponding to the transmission states at the respective channels, as a plurality of pointer values for respectively evaluating the transmission states at the plurality of channels which configure the communication network;

successively correcting the plurality of pointer values based on variations in phases at the respective channels which are detected from phase differences between the clocks at the respective channels and the reference clock; and indicating the plurality of pointer values successively corrected, at the same time, corresponding to the plurality of channels.

In order to achieve the above object, according to a second aspect of the present invention, there is provided a transmission state indicating method according to the first aspect, further comprising:

storing the plurality of pointer values in association with information for indicating the plurality of pointer values at the same time in accordance with the plurality of channels; and reading out the plurality of pointer values stored in association with the information for indicating the plurality of pointer values corresponding to the plurality of channels, at the same time.

In order to achieve the above object, according to a third aspect of the present invention, there is provided a transmission state indicating method according to the first aspect, further comprising:

carrying out processing for indicating the plurality of pointer values by relative values with respect to a pointer value of a reference channel to be a reference among the plurality of channels when the plurality of pointer values are indicated at the same time corresponding to the plurality of channels.

In order to achieve the above object, according to a fourth aspect of the present invention, there is provided a transmission state indicating method according to the first aspect, wherein, when the predetermined transmission system is an SDH (Synchronous Digital Hierarchy) system, the plurality of pointer values include, as factors of the respective channels to be objects for the delay absorption processings, values of AU (Administrative Unit) pointers included in H1 bytes and H2 bytes which have been defined to show head portions of the virtual containers in case where the low capacity containers are contained in a payload, at the $4^{th}$ row of an SOH (Section Overhead) frame in which the plurality of frames are frames of an STM (Synchronous transfer mode) and which is added to the payload of the frame of the STM.

In order to achieve the above object, according to a fifth aspect of the present invention, there is provided a transmission state indicating method according to the first aspect, wherein, when the predetermined transmission system is an SDH (Synchronous Digital Hierarchy) system, the plurality of pointer values include, as factors of the respective channels to be objects for the delay absorption processings, a value of H4 byte which has been defined at the $6^{th}$ row of a POH (Pass Overhead) added to head portions of the respective virtual containers in case where the plurality of frames are frames of an STM (Synchronous transfer mode) and the virtual containers included in the frames of the STM are a VC-3 format or a VC-4 format.

In order to achieve the above object, according to a sixth aspect of the present invention, there is provided a transmission state indicating method according to the first aspect, wherein, when the predetermined transmission system is an SDH (Synchronous Digital Hierarchy) system, the plurality of pointer values include, as factors of the respective channels to be the objects for the delay absorption processings, values of AU (Administrative Unit) pointers included in H1 bytes and H2 bytes which have been defined to show head portions of the virtual containers in case where the low capacity containers are contained in a payload, at the $4^{th}$ row of an SOH (Section Overhead) frame in which the plurality of frames are frames of an STM (Synchronous transfer mode) and which is added to the payload of the frame of the STM, and a value of H4 byte which has been defined at the $6^{th}$ row of a POH (Pass Overhead) added to the head portions of the respective virtual containers in case where the plurality of frames are frames of the STM (Synchronous transfer mode) and the virtual containers included in the frames of the STM are a VC-3 format or a VC-4 format.

In order to achieve the above object, according to a seventh aspect of the present invention, there is provided a transmission state indicating method according to the first aspect, further comprising:

converting the multiplexed frame on which mapping has been carried out into a concatenation mapping frame according to the rules of concatenation mapping; and detecting a plurality of index values included in the concatenation mapping frame converted according to rules of the concatenation mapping in place of the multiplexed frame on which mapping has been carried out.

In order to achieve the above object, according to an eighth aspect of the present invention, there is provided a transmission state indicating apparatus comprising:

a multiplexed frame acquiring unit (1M1, 1M2), in accordance with a predetermined transmission system, high capacity data is divided into a plurality of low capacity virtual containers and transmitted via a plurality of channels (STM (1), STM(2), ..., STM(n)) which configure a communication network (3) based on clocks at the respective channels, which acquires a multiplexed frame (STM-N) in which mapping, accompanying delay absorption processings corresponding to transmission states at the respective channels, has been carried out based on a reference clock with respect to the virtual containers at the respective channels included in a plurality of frames including the plurality of low capacity virtual containers;

a pointer value detecting unit (1E1, 1E2) which successively detects factors at the respective channels which are respectively included in the plurality of channels included in the multiplexed frame acquired by the multiplexed frame acquiring unit, and which are to be objects for delay absorption processings corresponding to the transmission states at the respective channels, as a plurality of pointer values for respectively evaluating the transmission states at the plurality of channels which configure the communication network, and which successively corrects the plurality of pointer values based on variations in phases at the respective channels to be detected from phase differences between the clocks at the respective channels and the reference clock; and a display unit (1I) which indicates the plurality of pointer values successively detected and corrected by the pointer value detecting unit, at the same time, corresponding to the plurality of channels.

In order to achieve the above object, according to a ninth aspect of the present invention, there is provided a transmission state indicating apparatus according to the eighth aspect, further comprising:

a storage unit (1F, 1L) which stores the plurality of pointer values successively detected and corrected by the pointer value detecting unit in association with information for indicating the plurality of pointer values at the same time in accordance with the plurality of channels; and a control unit (1H1, 1H2) which reads the plurality of pointer values stored in association with the information for indicating the plurality of pointer values corresponding to the plurality of channels at the storage unit, at the same time.

In order to achieve the above object, according to a tenth aspect of the present invention, there is provided a transmission state indicating apparatus according to the eighth aspect, further comprising:

a control unit (1H1, 1H2) which carries out processing for indicating the plurality of pointer values successively detected and corrected by the pointer value detecting unit, by relative values with respect to a pointer value of a reference channel to be a reference among the plurality of channels in the case where the plurality of pointer values are indicated at the same time corresponding to the plurality of channels.

In order to achieve the above object, according to an eleventh aspect of the present invention, there is provided a transmission state indicating apparatus according to the eighth aspect, wherein, when the predetermined transmission system is an SDH (Synchronous Digital Hierarchy) system, the plurality of pointer values include, as factors of the respective channels to be objects for the delay absorption processings, values of AU (Administrative-Unit) pointers included in H1 bytes and H2 bytes which have been defined to show head portions of the virtual containers in case where the low capacity containers are contained in a payload, at the $4^{th}$ row of an SOH (Section Overhead) frame in which the plurality of frames are frames of an STM (Synchronous transfer mode) and are added to payloads of the frames of the STM.

In order to achieve the above object, according to a twelfth aspect of the present invention, there is provided a transmission state indicating apparatus according to the eighth aspect, wherein, when the predetermined transmission system is an SDH (Synchronous Digital Hierarchy) system, the plurality of pointer values include, as factors of the respective channels to be objects for the delay absorption processings, a value of H4 byte which has been defined at the $6^{th}$ row of a POH (Pass Overhead) added to head portions of the respective virtual containers in case where the plurality of frames are frames of an STM (Synchronous transfer mode) and the virtual containers included in the frames of the STM system are a VC-3 format or a VC-4 format.

In order to achieve the above object, according to a thirteenth aspect of the present invention, there is provided a transmission state indicating apparatus according to the eighth aspect, wherein, when the predetermined transmission system is an SDH (Synchronous Digital Hierarchy) system, the plurality of pointer values include, as factors of the respective channels to be objects for the delay absorption processings, values of AU (Administrative Unit) pointers included in H1 bytes and H2 bytes which have been defined to show head portions of the virtual containers in case where the low capacity containers are contained in a payload, at the $4^{th}$ row of an SOH (Section Overhead) frame in which the plurality of frames are frames of an STM (Synchronous transfer mode) and are added to the payload of the frame of the STM, and a value of H4 byte which has been defined at the $6^{th}$ row of a POH (Pass Overhead) added to the head portions of the respective virtual containers when the plurality of frames are frames of the STM (Synchronous transfer mode) and the virtual containers included in the frames of the STM are a VC-3 format or a VC-4 format.

In order to achieve the above object, according to a fourteenth aspect of the present invention, there is provided a transmission state indicating apparatus according to the eighth aspect, further comprising:

a frame converting unit (1J) which converts the multiplexed frame acquired by the multiplexed frame acquiring unit into a concatenation mapping frame according to the rules of concatenation mapping; and an index value detecting unit (1K) which detects a plurality of index values included in the concatenation mapping frame converted according to rules of the concatenation mapping by the frame converting unit (1J).

In order to achieve the above object, according to a fifteenth aspect of the present invention, there is provided a transmission state indicating apparatus (1) comprising:

a plurality of clock reproducing units (1B1, 1B2, ..., 1Bn), in accordance with a predetermined transmission system, high capacity data is divided into a plurality of low capacity virtual containers and transmitted via a plurality of channels (STM(1), STM(2), ..., STM(n)) which configure a communication network (3) based on clocks at the respective channels, which reproduce clocks of the respective channels from reception signals of a plurality of frames including the plurality of low capacity virtual containers;

a plurality of frame receiving units (1A1, 1A2, ..., 1An) which receive the plurality of frames including the plurality of low capacity virtual containers in which the high capacity data is divided into the plurality of low capacity virtual containers and transmitted via the plurality of channels which configure the communication network, corresponding to the plurality of the respective channels, and detect the virtual containers at the respective channels based on the clocks of the respective channels reproduced by the plurality of clock reproducing units;

a reference clock generating unit (1C1, 1C2) which generates a reference clock;

a frame assembling unit (1D1, 1D2) which carries out mapping with respect to the virtual containers at the respective channels included in the plurality of the frames received corresponding to the plurality of channels by the plurality of frame receiving units, based on the reference clock from the reference clock generating unit, accompanying delay absorption processings corresponding to the transmission states of the respective channels, so as to be a multiplexed frame;

a pointer value detecting unit (1E1, 1E2) which successively detects factors at the respective channels which are respectively included in the plurality of frames included in the multiplexed frame on which mapping has been carried out by the frame assembling unit, and which are to be objects for delay absorption processings corresponding to the transmission states at the respective channels, as a plurality of pointer values for respectively evaluating transmission states at the plurality of channels which configure the communication network, and successively corrects the plurality of pointer values based on variations in phases at the respective channels to be detected from phase differences between the clocks at the respective channels reproduced by the plurality of clock reproducing units and the reference clock generated by the reference clock generating unit;

an information storage unit (1F) which stores the plurality of pointer values successively detected and corrected by the pointer value detecting unit in association with information for indicating the plurality of pointer values in accordance with the plurality of channels; and a display unit (1I) which indicates the plurality of pointer values for respectively evaluating the transmission states of the plurality of channels which configure the communication network, at the same time corresponding to the plurality of channels, based on the plurality of pointer values and the information for indicating the plurality of pointer values corresponding to the plurality of channels which have been stored in association with one another in the information storage unit.

In order to achieve the above object, according to a sixteenth of the present invention, there is provided a transmission state indicating apparatus according to the fifteenth aspect, further comprising:

a control unit (1H1, 1H2) which carries out processing for indicating the plurality of pointer values by relative values with respect to a pointer value of a reference channel to be a reference among the plurality of channels on the display unit.

In order to achieve the above object, according to a seventeenth aspect of the present invention, there is provided a transmission state indicating apparatus according to the fifteenth aspect, wherein, when the predetermined transmission system is an SDH (Synchronous Digital Hierarchy) system, the plurality of pointer values include, as factors of the respective channels to be objects for the delay absorption processings, values of AU (Administrative Unit) pointers included in H1 bytes and H2 bytes which have been defined to show head portions of the virtual containers in case where the low capacity containers are contained in a payload, at the $4^{th}$ row of an SOH (Section Overhead) frame in which the plurality of frames are frames of an STM (Synchronous transfer mode) and are added to the payload of the frame of the STM.

In order to achieve the above object, according to an eighteenth aspect of the present invention, there is provided a transmission state indicating apparatus according to the fifteenth aspect, wherein, when the predetermined transmission system is an SDH (Synchronous Digital Hierarchy) system, the plurality of pointer values include, as factors of the respective channels to be objects for the delay absorption processings, a value of H4 byte which has been defined at the $6^{th}$ row of a POH (Pass Overhead) added to head portions of the respective virtual containers in case where the plurality of frames are frames of an STM (Synchronous transfer mode) and the virtual containers included in the frames of the STM are a VC-3 format or a VC-4 format.

In order to achieve the above object, according to a nineteenth aspect of the present invention, there is provided a transmission state indicating apparatus according to the fifteenth aspect, wherein, when the predetermined transmission system is an SDH (Synchronous Digital Hierarchy) system, the plurality of pointer values include, as factors of the respective channels to be objects for the delay absorption processings, values of AU (Administrative Unit) pointers included in H1 bytes and H2 bytes which have been defined to show head portions of the virtual containers in case where the low capacity containers are contained in a payload, at the $4^{th}$ row of an SOH (Section Overhead) frame in which the plurality of frames are frames of an STM (Synchronous transfer mode) and are added to the payload of the frame of the STM, and a value of H4 byte which has been defined at the $6^{th}$ row of a POH (Pass Overhead) added to the head portions of the respective virtual containers in case where the plurality of frames are frames of the STM (Synchronous transfer mode) and the virtual containers included in the frames of the STM are a VC-3 format or a VC-4 format.

In order to achieve the above object, according to a twentieth aspect of the present invention, there is provided a transmission state indicating apparatus according to the fifteenth aspect, further comprising:

a frame converting unit (1J) which converts the multiplexed frame on which mapping has been carried out by the frame assembling unit into a concatenation mapping frame according to rules of concatenation mapping; and an index value detecting unit (1K) which detects a plurality of index values included in the concatenation mapping frame converted according to the rules of the concatenation mapping by the frame converting unit (1J).

Then, in accordance with the configuration as those of the first, eighth, and fifteenth aspects, a multiplexed frame is acquired in which mapping, accompanying delay absorption processings corresponding to transmission states at respective channels, has been carried out based on a reference clock with respect to virtual containers at the respective channels included in a plurality of frames including the plurality of low capacity virtual containers in which high capacity data is divided into the plurality of low capacity virtual containers and transmitted via the plurality of channels configuring a communication network (3), in accordance with a predetermined transmission system, based on the clocks at the respective channels. Factors at the respective channels which are respectively included in the plurality of frames included in the multiplexed frame, and which are to be the objects for delay absorption processings corresponding to the transmission states at the respective channels are successively detected as a plurality of pointer values for respectively evaluating the transmission states at the plurality of channels configuring the communication network. The plurality of pointer values successively detected as the plurality of pointer values based on variations in phases at the respective channels to be detected from the phase differences between the clocks at the respective channels and the reference clock are successively corrected. The plurality of pointer values corrected are indicated at the same time in accordance with the plurality of channels. Therefore, the operator can visually verify the pointer values for determining the transmission states at the plurality of channels configuring the communication network in accordance with the respective channels.

Further, in accordance with the configuration as those of the third, tenth, and sixteenth aspects, because the plurality of pointer values are associated with the respective channels, and are indicated by relative values with respect to the reference channel, the operator can easily verify those visually.

Furthermore, in accordance with a configuration as those of the second, fourth to sixth, ninth, eleventh to thirteenth, and seventeenth to nineteenth aspects, the effects which are the same as those of the inventions according to the first, eighth, and fifteenth aspects can be respectively achieved.

Moreover, in accordance with the configuration as those of the seventh, fourteenth, and twentieth aspects, other than a case in which the multiplexed frame on which mapping has been carried out is converted into a concatenation mapping frame according to the rules of concatenation mapping, and a plurality of index values included in the converted concatenation mapping frame are detected, the effects which are the same as those of the inventions of the first, eighth, and fifteenth aspects can be respectively achieved.

Note that the value of the pointer described in the present application shows a value of the AU (Administrative Unit) pointer in the SDH transmission system. However, the value of the pointer described in the present application shows a value of an STS (Synchronous Transport Signal) payload pointer in the SONET transmission system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the present invention.

DETAILED DESCRIPTION OF THE INVENTION

Figure 1:
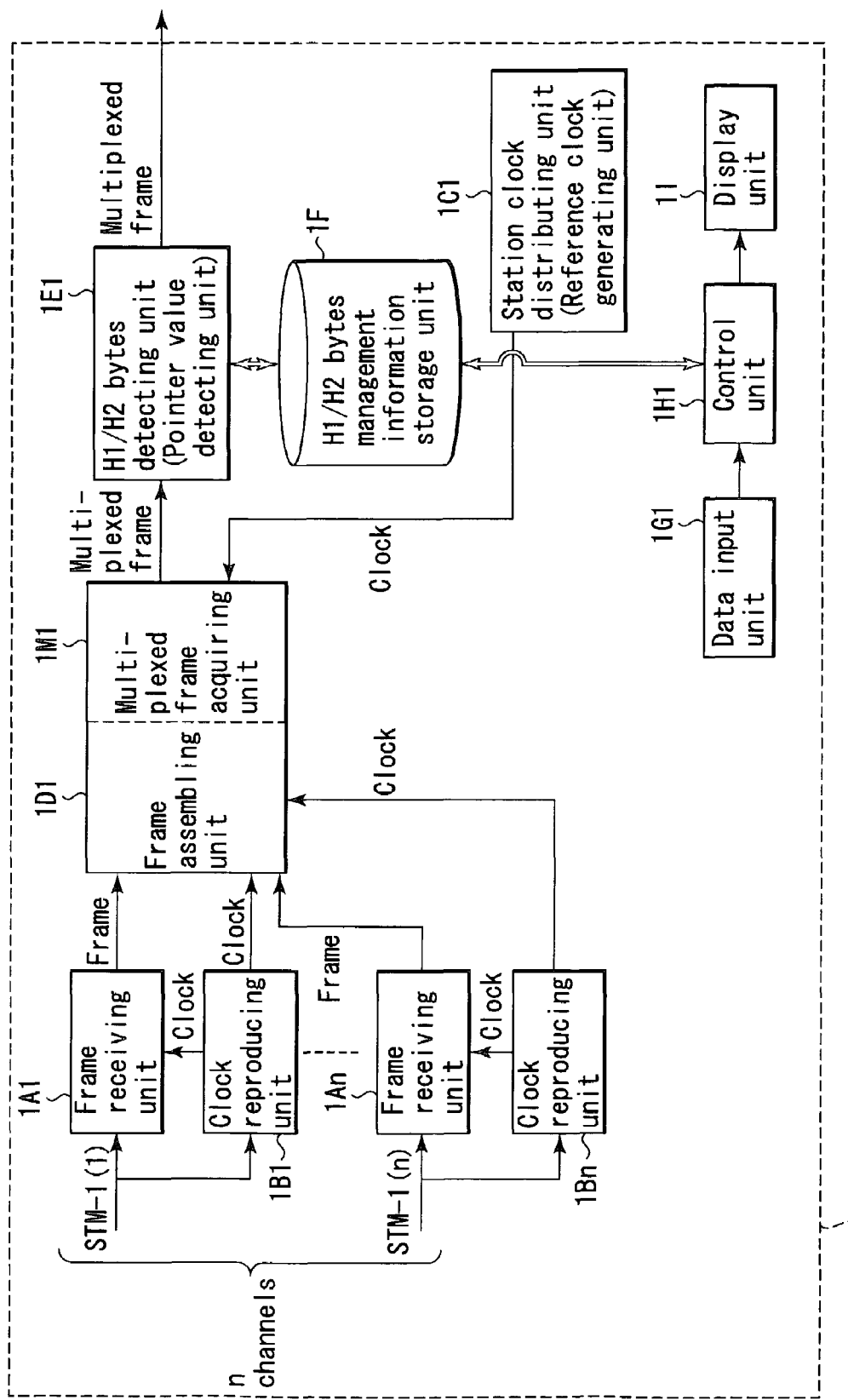
FIG. 1 is a block diagram showing a configuration example of a transmission state indicating apparatus 1 according to a first embodiment of the present invention.

Reference will now be made in detail to the presently preferred embodiments of the invention as illustrated in the accompanying drawings, in which like reference numerals designate like or corresponding parts.

Hereinafter, respective embodiments of the present invention will be described with reference to the drawings.

First Embodiment

FIG. 1 is a block diagram showing a configuration example of a transmission state indicating apparatus 1 according to a first embodiment of the present invention.

First, environments and the outline to which the transmission state indicating apparatus according to the invention is applied will be described.

In the SDH/SONET transmission system as described above, multiplex mapping is carried out on low capacity data, the low capacity data is transmitted as high capacity data, and the data on which multiplex mapping has been carried out can be dropped and distributed as the low capacity data.

In contrast with such a transmission system by multiplex mapping, as described above, a transmission system by a virtual concatenation using a technique in which, in order to effectively use a transmission path, high capacity data is virtually divided and transmitted to a plurality of transmission paths having limited transmission capacities, and the divided data are assembled again at the reception side, has been recently standardized.

The present invention aims for realizing a transmission state indicating apparatus which, when the transmission system by virtual concatenation is applied to, for example, a network in accordance with existing SDH/SONET transmission system, allows a plurality of pointer values for evaluating transmission states of a plurality of channels configuring the network to be visually verified by associating with the respective channels.

Figure 5A:
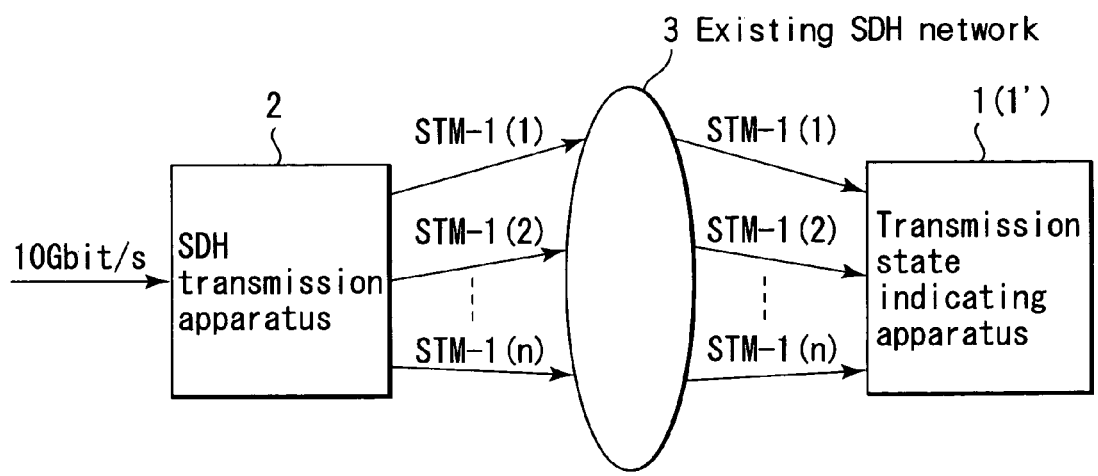
FIG. 5A is a schematic diagram showing a sketch of one example of a connecting relationship of a communication network to which the transmission state indicating apparatus 1 of FIG. 1 is applied.

FIG. 5A is a schematic diagram showing one example of a connecting relationship of a communication network to which the transmission state indicating apparatus 1 of FIG. 1 is applied.

Namely, the transmission state indicating apparatus 1 according to the embodiment is connected to an SDH transmission apparatus 2 via a communication network 3 by using a plurality of STM-1(1), STM-1(2), . . . , STM-1(n) channels of an STM-1 (Synchronous transfer mode Level 1) which serve as a plurality of channels composed of the existing network which is in accordance with the SDH transmission system and which is defined to include 2016 ch at the conversion of a bit rate of the basic speed of 155.52 Mbit/s and a transmission capacity of 64 kbit/s by the ITU-T.

The SDH transmission apparatus 2 in accordance with the SDH transmission system receives a trunk line system digital signal such as an optical pulse signal multiplexed so as to be a high capacity having a bit rate of a transmission speed of 10 Gbit/s (accurately 9.95328 Gbit/s), divides the digital signal into a plurality of low capacity virtual containers having a basic speed of 155.52 Mbit/s, and transmits the containers to the plurality of STM-1(1), STM-1(2), . . . , STM-1(n) channels.

Figure 2:
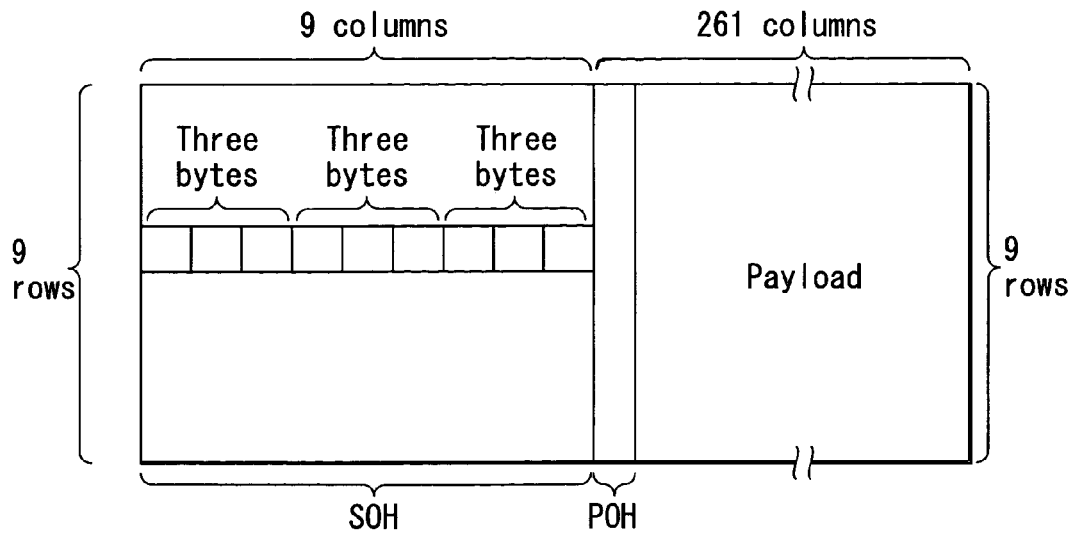
FIG. 2 is a schematic diagram showing a configuration of an STM-1 which is a basic frame to be transmitted by an SDH which is applied to the invention.

The SDH transmission apparatus 2 in accordance with the SDH transmission system transmits the high capacity data having hierarchical frames to separately a plurality of channels. When the respective channels are the STM-1, one frame data of a total of 2430 bytes formed by 9 rows×270 columns as shown in FIG. 2 is transmitted at a transmission cycle of 125 μs to the respective channels.

Accordingly, the high capacity data transmitted from the SDH transmission apparatus 2 is composed of n frames of the plurality of STM-1(1), STM-1(2), . . . , STM-1(n) (for example, in the case described above, 64 frames).

Figure 5B:
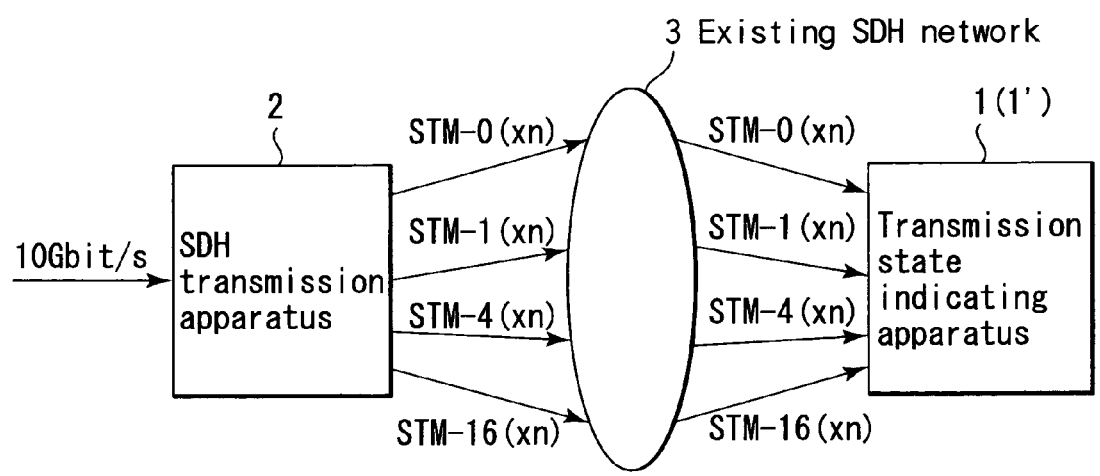
FIG. 5B is a schematic diagram showing a sketch of another example of the connecting relationship of the communication network to which the transmission state indicating apparatus 1 of FIG. 1 is applied.

FIG. 5B is a schematic diagram showing another example of the connecting relationship of the communication network to which the transmission state indicating apparatus 1 of FIG. 1 is applied.

Namely, as the other example, as shown in FIG. 5B, the transmission state indicating apparatus 1 according to the embodiment is, in accordance with the SDH transmission system, connected to the SDH transmission apparatus 2 via the communication network 3 by using the STM channels with a predetermined combination arbitrarily including STM-0 (51.84 Mbit/s)×n, STM-1 (155.52 Mbit/s)×n, STM-4 (622.08 Mbit/s)×n, and STM-16 (2488.32 Mbit/s)×n, which serve as a plurality of channels composed of the existing communication network defined by the ITU-T, and in which the total bit rate is 9.95328 Gbit/s.

Accordingly, the SDH transmission apparatus 2, as the another example, in accordance with the SDH transmission system receives a trunk line system digital signal such as an optical pulse signal multiplexed so as to be a high capacity in which, for example, a bit rate of a transmission speed is 10 Gbit/s (accurately 9.95328 Gbit/s), divides the digital signal into a plurality of low capacity virtual containers of the SMT, and transmits them to the plurality of STM channels with the predetermined combination arbitrarily including STM-0 (51.84 Mbit/s)×n, STM-1 (155.52 Mbit/s)×n, STM-4 (622.08 Mbit/s)×n, and STM-16 (2488.32 Mbit/s)×n which serve as a plurality of channels composed of the existing communication network, and in which the total bit rate is 9.95328 Gbit/s.

Hereinafter, an example of the basic frame which is the STM-1 will be described. At the STM-1 frame, as shown in FIG. 2, each frame is configured from a payload composed of 9 row×260 columns, a POH (Pass Overhead) composed of 9 rows×1 column, and an SOH (Section Overhead) composed of 9 rows×9 columns and added to the payload.

At the $4^{th}$ row of this SOH frame, values which are AU pointers called H1, H2, and H3 bytes which are respectively composed of three bytes are defined.

The AU pointers show head portions of the virtual containers when low capacity virtual containers are contained in the payload.

The values of the AU pointers are composed of the subordinative 10 bits among all of the bytes in which H1 bytes and H2 bytes are added to one another, and the values within a normal range are defined to be from 0 to 782.

The values of the AU pointers are used as factors which are to be objects for delay-absorption processings corresponding to the transmission states at the respective channels in the case described above in which high capacity data is divided into low capacity data, the divided low capacity data are transmitted to different networks, and the data are assembled again at the reception side.

As the respective virtual containers contained in the payload, there are four types of formats of the virtual containers which are a VC-1 (about 1.5 Mbit/s), a VC-2 (about 6 Mbit/s), a VC-3 (about 50 Mbit/s), and a VC-4 (about 150 Mbit/s), and the POHs (Pass Overhead) are respectively added to the heads of the respective virtual containers.

Figure 3:
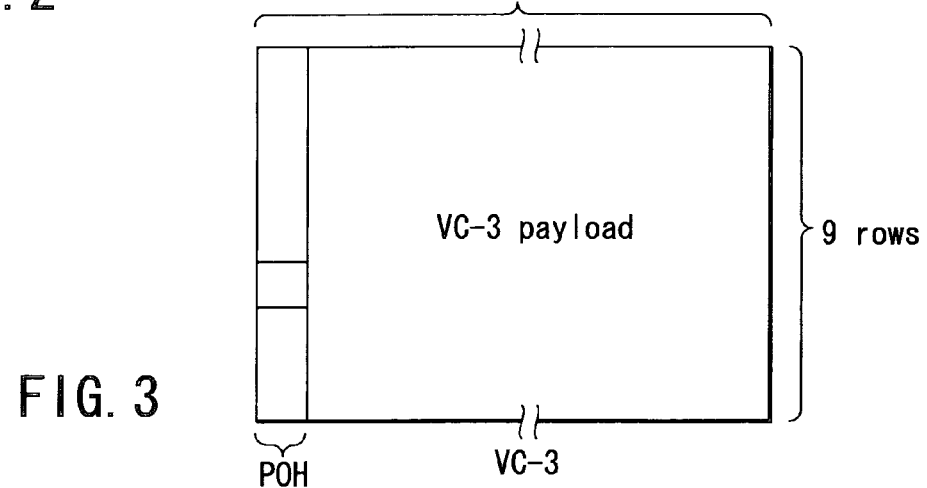
FIG. 3 is a schematic diagram showing a configuration of a VC-3 which is a general virtual container to be transmitted by the SDH which is applied to the invention.

For example, in a case of the virtual containers of the format of VC-3, the virtual container is composed of 9 rows× 85 columns as shown in FIG. 3, and the POHs are added to the heads of the respective virtual-containers.

Further, the addresses at the head portions of the virtual containers are provided by the values of the AU pointers described above.

Figure 4A:
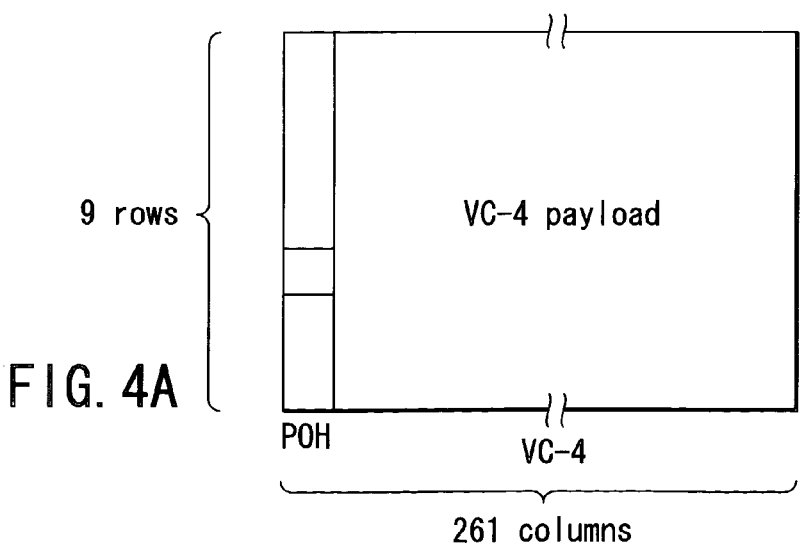
FIG. 4A is a schematic diagram showing a configuration of a VC-4 which is a general virtual container to be transmitted by the SDH which is applied to the invention.

In a case of the respective virtual containers of the format of VC-4, the virtual container is composed of 9 rows×261 columns as shown in FIG. 4, and the POHs are added to the heads of the respective virtual containers in the same way.

At the first column of the POH of each virtual container of the formats of VC-3 and VC-4, H4 byte are defined at the sixth row.

The H4 byte is used as a factor which will be an object for delay-absorption processings corresponding to the transmission states at the respective channels in the case described above in which high capacity data is divided into low capacity data, the divided low capacity data are transmitted to different networks, and the data are assembled again at the reception side.

Then, the H4 byte includes an MFI1 (Multi frame indicator 1) composed of the subordinate 4 bits and an MFI2 (Multi frame indicator 2) composed of the superordinate 8 bits, and the values from 0 to 4095 can be set thereto.

The communication network 3 shown in FIG. 5A is an example of the existing SDH network connected to the SDH transmission apparatus 2 of the SDH transmission system and the transmission state indicating apparatus 1 according to the embodiment via the a plurality of STM-1(1), STM-1(2), . . . , STM-1(n) channels.

This communication network 3 is connected to a high capacity communication channel of, for example, 10 Gbit/s or the like, via the SDH transmission apparatus 2 of the SDH system.

The transmission state indicating apparatus 1 according to the embodiment acquires a multiplexed frame STM-N in which the respective virtual containers are correctly assembled to be the original frames based on the values of the AU pointers or the H4 byte in the POH frame included in the plurality of virtual containers in which high capacity data is divided into a plurality of low capacity virtual containers and transmitted from the SDH transmission apparatus 2 in accordance with the SDH transmission system by the communication network 3 having the plurality of channels STM-1(1), STM-1(2), ..., STM-1(n). In addition, the transmission state indicating apparatus 1 detects pointer values for evaluating the transmission states of the communication network 3 having the plurality of channels STM-1(1), STM-1(2), ..., STM-1(n) from the acquired multiplexed frame STM-N, and corrects the pointer values in accordance with a transmission delayed amount at each channel or an amount of variations in phases due to phase differences between the plurality of low capacity channel sides and a clock of the high capacity channel. Therefore, the transmission state indicating apparatus 1 according to the embodiment indicates the pointer values in accordance with the plurality of channels at the same time, as the pointer values showing the transmission states of the communication network having the plurality of channels.

Namely, in the present invention, in accordance with a predetermined transmission system such as the SDH (SONET) transmission system or the like, the multiplexed frame STM-N is acquired in which mapping, accompanying delay absorption processings corresponding to transmission states at respective channels, has been carried out with respect to virtual containers at the respective channels included in a plurality of frames including the plurality of low capacity virtual containers in which high capacity data is divided into the plurality of low capacity virtual containers and transmitted, based on the clocks at the respective channels via the plurality of channels STM-1(1), STM-1(2), ..., STM-1(n) which configure the communication network 3, based on the reference clock. Factors at the respective channels which are respectively included in the plurality of frames included in the multiplexed frame STM-N, and which are to be the objects for delay absorption processings corresponding to the transmission states at the respective channels are successively-detected as a plurality of pointer values for respectively evaluating the transmission states at the plurality of channels STM-1(1), STM-1(2), ..., STM-1(n) which configure the communication network 3. The plurality of pointer values are successively corrected based on variations in phases at the respective channels to be detected from the phase differences between the clocks at the respective channels and the reference clock, and the plurality of pointer values successively corrected are indicated at the same time in accordance with the plurality of channels.

As shown in FIG. 1, the transmission state indicating apparatus 1 according to the embodiment has: a plurality of clock reproducing units 1B1, 1B2, ..., 1Bn; a plurality of frame receiving units 1A1, 1A2, ..., 1An; a reference clock generating unit (station clock distributing unit) 1C1; a frame assembling unit 1D1; a pointer value detecting unit (H1/H2 bytes detecting unit) 1E1; an information storage unit (H1/H2 bytes management information storage unit) 1F; and a display unit 1I. The plurality of clock reproducing units 1B1, 1B2, ..., 1Bn reproduce respective clocks in accordance with each of the plurality of channels STM(1), STM(2), ..., STM(n) from the received signals of the plurality of frames including the plurality of low capacity virtual containers in which, in accordance with the SDH transmission system as a predetermined transmission system, high capacity data is divided into a plurality of low capacity virtual containers and transmitted via the plurality of channels STM(1), STM(2), ..., STM(n) which configure the communication network 3. The plurality of frame receiving units 1A1, 1A2, ..., 1An receive the plurality of frames including the plurality of low capacity virtual containers in which high capacity data is divided into a plurality of low capacity virtual containers and transmitted via the plurality of channels configuring the communication network 3, in accordance with each of the plurality of channels STM(1), STM(2), ..., STM(n), and detect the virtual containers at the respective channels based on the clocks at the respective channels reproduced by the plurality of clock reproducing units 1B1, 1B2, ..., 1Bn. The reference clock generating unit (station clock distributing unit) 1C1 generates a reference clock. The frame assembling unit 1D1 carries out, accompanying the delay absorption processing corresponding to the transmission states at the respective channels, mapping of the virtual containers at the respective channels included in the plurality of frames received in accordance with each of the plurality of channels by the plurality of frame receiving units 1A1, 1A2, ..., 1An, on the multiplexed frame STM-N. The pointer value detecting unit (H1/H2 bytes detecting unit) 1E1 successively detects the factors at the respective channels which are respectively included in the plurality of frames included in the multiplexed frame STM-N on which mapping has been carried out by the frame assembling unit 1D1, and which are to be the objects for delay absorption processings corresponding to the transmission states at the respective channels, as a plurality of pointer values for respectively evaluating the transmission states at the plurality of channels STM(1), STM(2), ..., STM(n) which configure the communication network 3, and successively corrects the plurality of pointer values based on variations in phases at the respective channels detected from the phase differences between the clocks at the respective channels reproduced by the plurality of clock reproducing units 1B1, 1B2, ..., 1Bn, and the reference clock generated by the reference clock generating unit 1C1. The information storage unit (H1/H2 bytes management information storage unit) 1F stores the plurality of pointer values successively detected and successively corrected by the pointer value detecting unit 1E1 in association with information for indicating those in accordance with the plurality of channels STM(1), STM(2), ..., STM(n). The display unit 1I indicates the plurality of pointer values for respectively evaluating the transmission states at the plurality of channels STM(1), STM(2), ..., STM(n) which configure the communication network 3 in-accordance with the plurality of channels STM(1), STM(2), ..., STM(n), based on the information for indicating the plurality of pointer values stored in the information storage unit 1F in accordance with the plurality of channels STM-1(1), STM-1(2), ..., STM-1(n).

Namely, more concretely, as shown in FIG. 1, the transmission state indicating apparatus 1 according to the embodiment is composed of the plurality of frame receiving units 1A1, 1A2, ..., 1An, the plurality of clock reproducing units 1B1, 1B2, ..., 1Bn, the station clock distributing unit (reference clock generating unit) 1C1, a multiplexed frame acquiring unit 1M1, the H1/H2 bytes detecting unit (pointer value detecting unit) 1E1, the H1/H2 bytes management information storage unit (information storage unit) 1F, a data input unit 1G1, a control unit 1H1, and the display unit 1I.

The plurality of frame receiving units 1A1, 1A2, ..., 1An have a function of receiving the virtual containers configuring n frames via the respective n channels composed of the plurality STM-1(1), STM-1(2), ..., STM-1(n) channels, and detecting the SOHs in the received virtual containers synchronously with the clocks outputted from the plurality of clock reproducing units 1B1, 1B2, ..., 1Bn, a function of detecting the virtual containers from the SOHs, and a function of outputting the detected virtual containers to the frame assembling unit 1D1.

The plurality of clock reproducing units 1B1, 1B2, ..., 1Bn respectively reproduce clocks from the received signals of the respective frames received via the n channels composed of the plurality of STM-1(1), STM-1(2), ..., STM-1(n) channels, and output the reproduced clocks to the plurality of frame receiving units 1A1, 1A2, ..., 1An, and the frame assembling unit 1D1.

Note that, in the present embodiment, with respect to the correspondence relationship between the plurality of frame receiving units 1A1, 1A2, ..., 1An and the plurality of clock reproducing units 1B1, 1B2, ..., 1Bn, it is configured such that a clock signal is outputted from a clock reproducing unit to a frame receiving unit whose suffixes are the same as each other.

The station clock distributing unit 1C1 has a function of preparing a clock in the transmission state indicating apparatus 1, and outputting the prepared clock to the frame assembling unit 1D1.

The frame assembling unit 1D1 has a function of carrying out, accompanying the delay absorption processing corresponding to the transmission states at the respective channels, mapping of the POHs and payloads of the respective virtual containers received by the plurality of frame receiving units 1A1, 1A2, ..., 1An via the respective channels, on the multiplexed frame STM-N, and a function of outputting the multiplexed frame STM-N on which the mapping has been carried out to the H1/H2 bytes detecting unit 1E1 via the multiplexed frame acquiring unit 1M1.

Figure 4B:
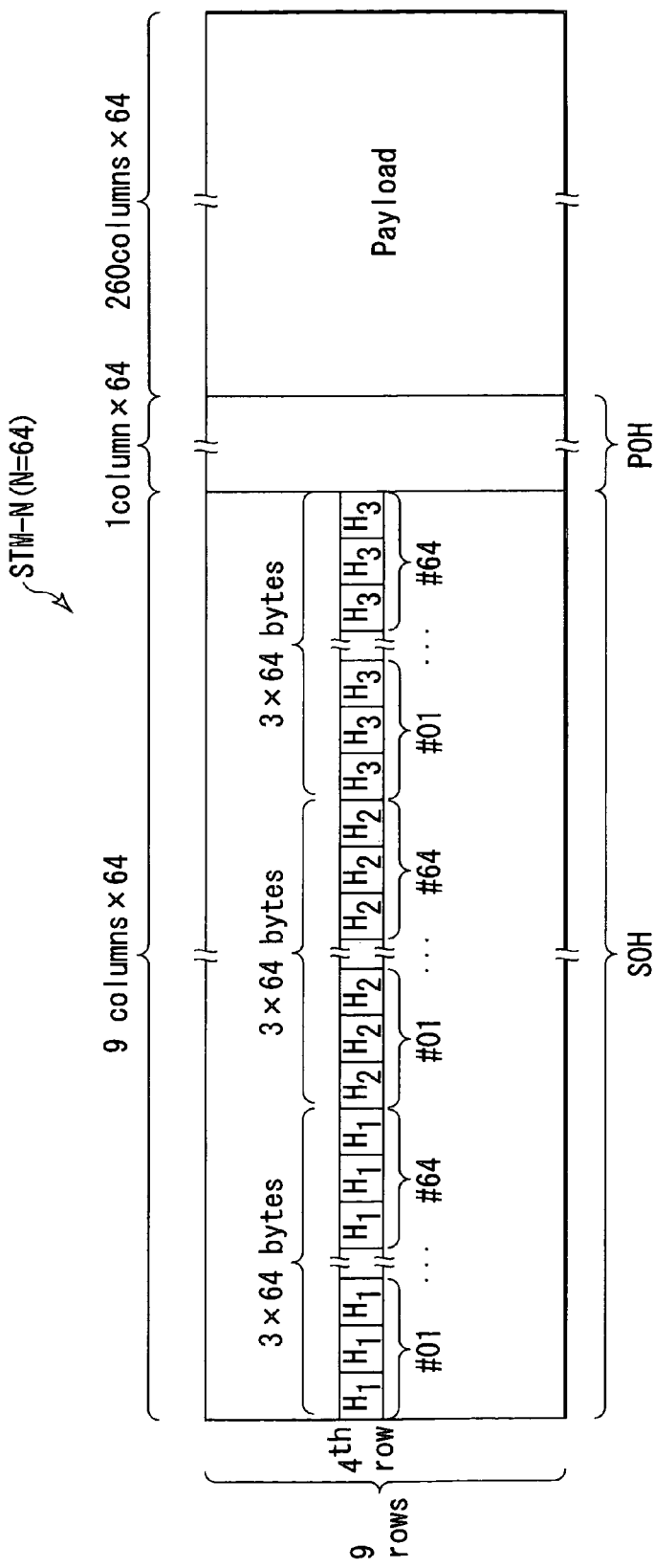
FIG. 4B is a schematic diagram showing a configuration of an STM-N (N=64) which is a maximum multiplexed frame to be transmitted by the SDH which is applied to the invention.

FIG. 4B is a schematic diagram showing a configuration of the multiplexed frame STM-N acquired by the multiplexed frame acquiring unit 1M1 in this way.

This configuration of the multiplexed frame STM-N shows a case in which, given that N=64, the multiplexed frame STM-N is multiplexed so as to be a high capacity in which the bit rate of the transmission speed is 10 Gbit/s (accurately 9.95328 Gbit/s).

At this multiplexed frame STM-N, 64 frames including the STM-1(1), the STM-1(2), ..., the STM-1(64) are contained as the virtual containers.

At the frame which is the STM-N, as shown in FIG. 4B, each frame is configured from a payload composed of 9 rows×260 columns×64, an SOH (Section Overhead) which is composed of 9 rows×9 columns×64 and which is added to the payload, and a POH (Pass Overhead) composed of 9 rows×1 column×64.

At the $4^{th}$ row of this SOH, values which are 3×64 AU pointers called H1 (#01 to #64), H2 (#01 to #64), and H3 (#01 to #64) bytes which are respectively composed of three bytes is defined.

The 64 AU pointers show the head portions of the 64 virtual containers respectively contained in the payloads.

The H1/H2 bytes detecting unit 1E1 has a function of detecting, as a plurality of pointer values for respectively evaluating the transmission states at the plurality of channels STM-1(1), STM-1(2), ..., STM-1(n) which configure the communication network 3, the AU pointers at the respective channels which have been defined as H1/H2 bytes (accurately, the values which are 3×3×64 AU pointers called H1 (#01 to #64), H2 (#01 to #64), and H3 (#01 to #64) bytes) at the $4^{th}$ row of the SOH, and which serve as the factors at the respective channels which are to be the objects for delay absorption processings corresponding to the transmission states at the respective channels; a function of detecting variations in phases from the phase differences between the clocks of the respective communication networks (n respective channels) reproduced by the plurality of clock reproducing units 1B1, 1B2, ..., 1Bn, and outputted from the frame assembling unit 1D1, and a clock outputted by the station clock distributing unit 1C1, and correcting, based on this detected variations in phases, the values of the AU pointers at the respective channels which are to be the objects for delay absorption processings corresponding to the transmission states at the respective channels; a function of detecting a channel from a sequence number showing a transmission channel in a frame; a function of adding detecting times of the variations in phases to the corrected values of the AU pointers and the detected channels, and causing the H1/H2 bytes management information storage unit 1F to store the combinations at the respective channels and the values of the AU pointers at the respective channels having the detecting times added thereto; and a function of transmitting the multiplexed frame STM-N outputted from the frame assembling unit 1D1 to the exterior.

At the H1/H2 bytes management information storage unit 1F, combinations of the values of the AU pointers of the respective channels detected from the H1/H2 bytes defined at the $4^{th}$ row of the SOH of the multiplexed frame SMN-N and corrected, the respective channels, and the respective detecting times are correspondingly stored.

The data input unit 1G1 receives normal data input by an operation of an operator, and has a function of outputting the detecting times inputted by the operator, to the control unit 1H1, and a function of outputting the reference channel designated by the operator to the control unit 1H1.

Note that, in the present embodiment, the data input unit 1G1 has only the function of designating a reference channel by the operator from the exterior. However, the present embodiment is not limited thereto, and it goes without saying that the data input unit 1G1 may have a function of setting a threshold value for determining whether it is unusual or not, and a function of inputting a sampling cycle for the receiving processing and the multiplexing processing as described above.

The control unit 1H1 has a function of determining by the operator whether or not there is a request for indication of the values of the AU pointers at the respective channels, as the plurality of pointer values for respectively evaluating the transmission states at the plurality of channels STM-1(1), STM-1(2), ..., STM-1(n) which configure the communication network 3, in accordance with whether or not the detecting times outputted from the data input unit 1G1 has been received; a function of reading the values of the AU pointers at the respective channels corresponding to the detecting times outputted from the data input unit 1G1; a function of determining whether or not the reference channel is designated by the operator in accordance with whether or not the reference channel outputted from the data input unit 1G1 has been received; a function of, as a result of the determination, when it is determined that the reference channel is designated, calculating relative differences between the values of the AU pointers at the respective channels read at the same time and the value of the AU pointer at the reference channel; a function of determining whether it is an error or not in accordance with whether or not the calculated relative differences are greater than or equal to a threshold value which has been determined in advance; a function of, as a result of the determination, when it is determined that the relative differences are in error, indicating an alarm with a strip line in accordance with the channel in error; a function of, as a result of the determination described above, when it is determined that the relative differences are not in error, associating and indicating the values of the AU pointers at the respective channels and the respective channels, as points on a two-dimensional plane at the same time; a function of, as a result of the above-described determination, when it is determined that the reference channel is not designated, determining whether or not the values of the AU pointers at the respective channels are within a normal range; a function of, as a result of the determination, when it is determined that the values of the AU pointers at the respective channels are within a normal range, associating the values of the AU pointers at the respective channels read out at the same times corresponding to the respective channels, and indicating those as points on a two-dimensional plane at the same time; and a function of, as a result of the above-described determination, when it is determined that the values of the AU pointers at the respective channels are not within a normal range, indicating an alarm with a sprit line corresponding to the channels in error.

Note that, in the present embodiment, the values of the AU pointers at the respective channels at a predetermine time at every sampling cycle as described above are indicated corresponding to the respective channels. However, the present embodiment is not limited thereto, and it goes without saying that a range of variations in the values of the AU pointers at the respective channels at predetermine time intervals, in other words, the upper limit and the lower limit of the values of the AU pointers at the respective channels may be indicated corresponding to the respective channels, and a cycle of variations between the upper limit and the lower limit of the values of the AU pointers at the respective channels may be indicated corresponding to the respective channels.

Note that, in the present embodiment, the values of the AU pointers at the respective channels read out at the same time are indicated on a two-dimensional plane corresponding to the channels. However, the present embodiment is not limited thereto, and it goes without saying that the values of the AU pointers at the respective channels, the respective channels, and the detecting times are indicated as points on a three-dimensional plane.

The display unit 1I has a display screen as will be described later, and indicates the respective channels and the values of the AU pointers with being made to correspond to one another, as points on a two-dimensional plane, on the display screen, and indicates an alarm with a strip line at the channel in error.

Note that, in the transmission state indicating apparatus of the present embodiment, only the H1/H2 bytes are detected as pointer values. However, the present embodiment is not limited thereto, and it goes without saying that, as the detection of pointer values, in addition to the H1 bytes and the H2 bytes, the H4 byte in the POH may be detected, and only H4 byte in the POH may be detected.

In this case, a configuration having a function of detecting the H4 byte in the POH and a configuration in which the combination of the value of the H4 byte, a detecting time, and the channel is stored separately added to the configuration of the transmission state indicating apparatus according to the embodiment.

Next, the operations of the transmission state indicating apparatus 1 configured as described above will be described with reference to FIG. 6.

Note that, from the standpoint of focusing the description on the point of the present invention, in the following description, only the indication processing which the control unit 1H1 of the transmission state indicating apparatus 1 carries out, i.e., the processing in which the AU pointers at the respective channels which have been stored in the H1/H2 bytes management information storage unit 1F are indicated, as described above, in accordance with the respective channels at the same time, will be described.

Figure 6:
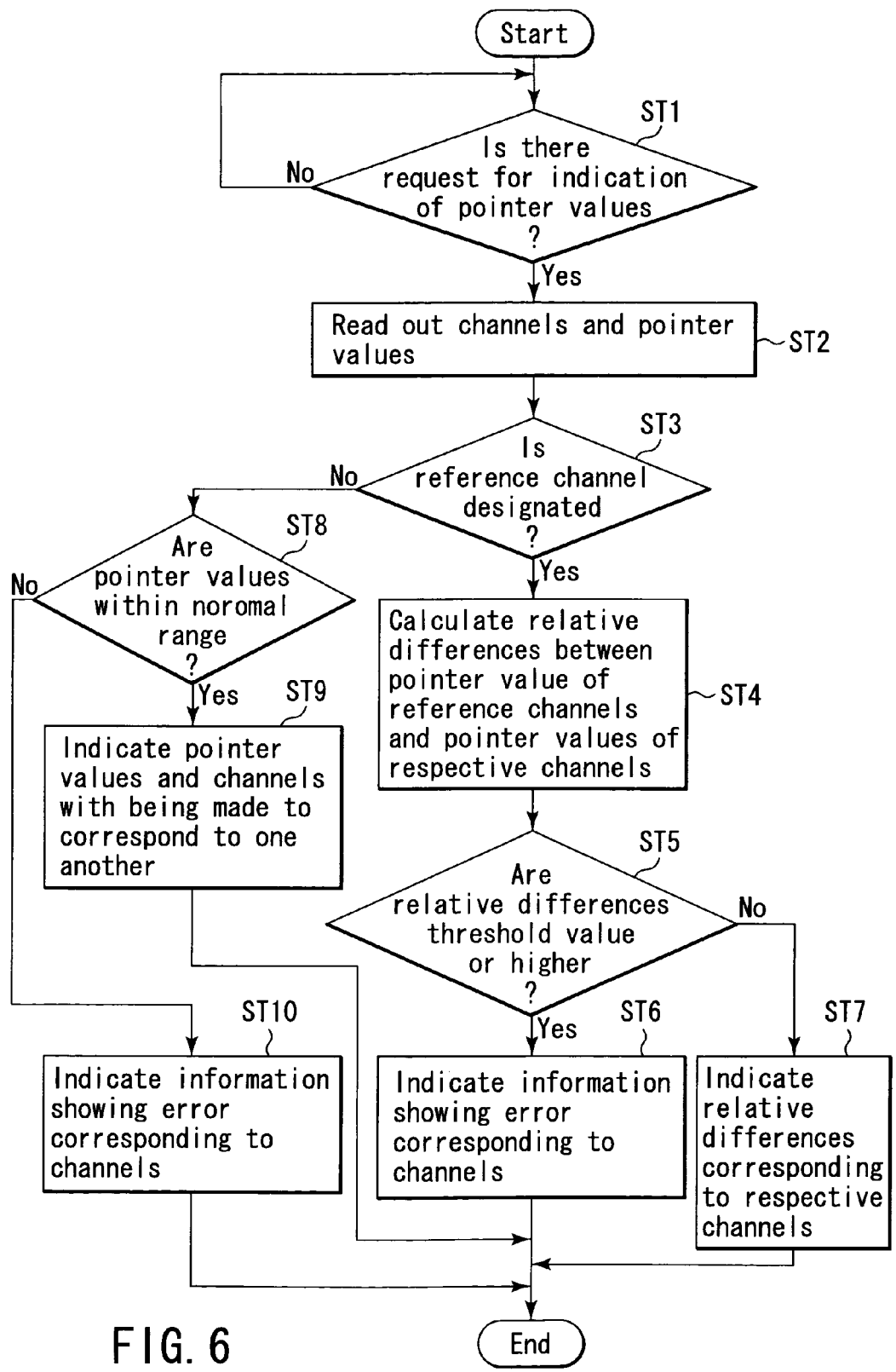
FIG. 6 is a flowchart for explanation of the operations of a control unit 1H1 of the transmission state indicating apparatus 1 of FIG. 1.

FIG. 6 is a flowchart for explanation of the operations of the control unit 1H1 of the transmission state indicating apparatus 1 according to the embodiment.

First, the control unit 1H1 determines whether or not there is a request for indication of the values of the AU pointers, in accordance with whether or not the detecting times inputted from the data input unit 1G1 by an operation of the operator has been received (step ST1).

When it is determined that there is a request for indication of the values of the AU pointers in step ST1 (step ST1: Yes), the control unit 1H1 reads the respective channels corresponding to the detecting times and the values of the AU pointers at the respective channels from the H1/H2 bytes management information storage unit 1F (step ST2).

On the other hand, when it is determined that there is no request for indication of the values of the AU pointers in step ST1 (step ST1: No), the control unit 1H1 successively continues the processing of determining whether or not there is a request for indication of the values of the AU pointers.

In step ST3, the control unit 1H1 determines whether or not a reference channel is designated from the data input unit 1G1 by an operation of the operator.

When it is determined that a reference channel is designated in step ST3 (step ST3: Yes), the control unit 1H1 calculates relative differences between the value of the AU pointer of the designated reference channel and the values of the AU pointers at the other channels (step ST4).

Next, the control unit 1H1 determines whether or not it is in error in accordance with whether or not the calculated relative differences are greater than or equal to the predetermined threshold value (step ST5).

When it is determined as being in error in step ST5 (step ST5: Yes), the control unit 1H1 indicates an alarm with a strip line at the channel in error (step ST6).

When it is determined as being not in error in step ST5 (step ST5: No), the control unit 1H1 indicates the calculated relative differences as points on a two-dimensional plane corresponding to the respective channels on the indication display of the display unit 1I at the same time (step ST7).

Figure 7:
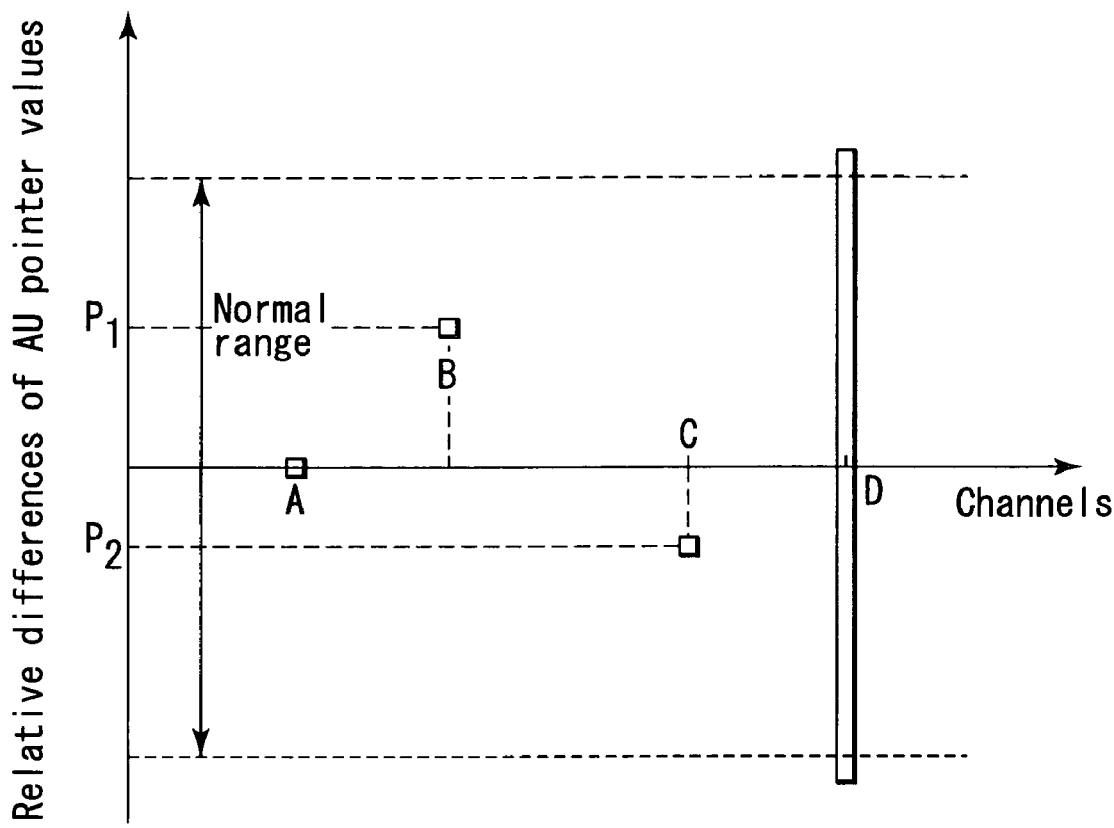
FIG. 7 is a schematic diagram showing one example of a display screen of the transmission state indicating apparatus 1 of FIG. 1.

FIG. 7 is a schematic diagram showing one example of the display screen by the display unit 1I of the transmission state indicating apparatus 1 according to the embodiment.

The abscissa of FIG. 7 shows the respective channels configuring the communication network, and the ordinate thereof shows the values of the AU pointers included in the frames.

Moreover, the respective points which have been plotted on the screen show the relative differences between the values of the AU pointers corresponding to the respective channels and the value of the AU pointer at the reference channel.

By the way, in the example shown in FIG. 7, Channel A is the reference channel.

A relative difference between the value of the AU pointer at Channel B and the value of the AU pointer at Channel A is P1 (a positive value).

Further, a relative difference between the value of the AU pointer at Channel C and the value of the AU pointer at Channel A is P2 (a negative value).

The indication of an alarm with the strip line at Channel D shows the fact that the relative difference between the value of the AU pointer at Channel D and the value of the AU pointer at Channel A is not within the predetermined normal range.

On the other hand, when it is determined that the reference channel has not been designated in step ST3 (step ST3: No), the control unit 1H1 determines whether or not it is in error in accordance with whether or not the values of the AU pointers at the respective channels are within the normal range (step ST8).

When it is determined that the values of the AU pointers at the respective channels are within the normal range in step ST 8 (step ST8: Yes), the control unit 1H1 indicates the values of the AU pointers at the respective channels as points on a two-dimensional plane corresponding to the respective channels on the display screen of the display unit 1I at the same time (step ST9).

On the other hand, when it is determined that a value of the AU pointer at any channel is not within the normal range in step ST 8 (step ST8: No), the control unit 1H1 determines that the channel is error, and indicates an alarm with a strip line at the channel (step ST10).

Figure 8A:
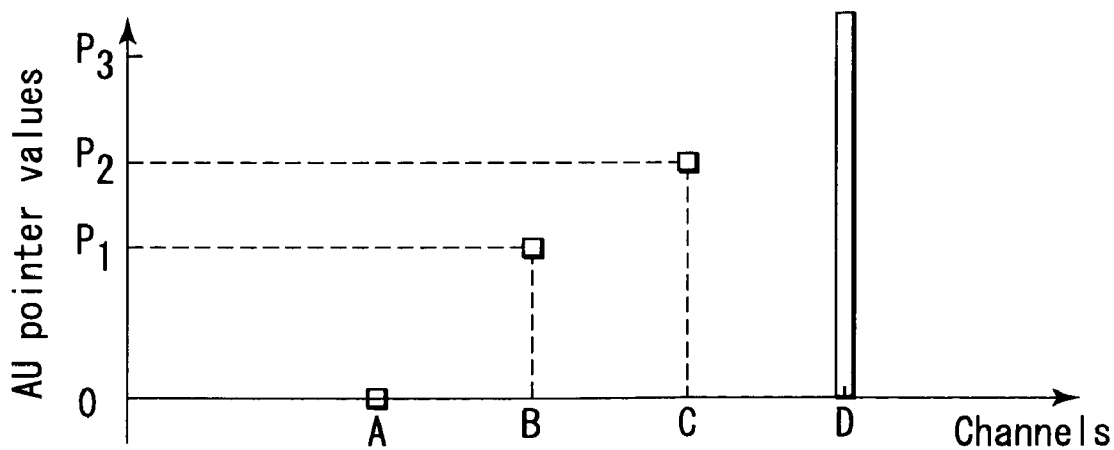
FIG. 8A is a schematic diagram showing another example of the display screen of the transmission state indicating apparatus 1 of FIG. 1.

FIG. 8A is a schematic diagram showing another example of the display screen of the display unit 1I in accordance with the transmission state indicating apparatus 1 according to the embodiment.

The abscissa of FIG. 8A shows the respective channels configuring the communication network, and the ordinate thereof shows the values of the AU pointers included in the respective frames.

Moreover, in FIG. 8A, the respective points which have been plotted on the screen show the values of the AU pointers corresponding to the respective channels.

Further, the indication of an alarm by a strip corresponding to a channel shows the fact that the value of the AU pointer of the frame is not within the normal range.

By the way, in the example shown in FIG. 8A, the value of the AU pointer at Channel A is 0, the value of the AU pointer at Channel B is P1, the value of the AU pointer at Channel C is P2, and the value of the AU pointer at Channel D is not within the normal range, in other words, is an indication of an alarm showing being in error.

In accordance with a series of processings as described above, the transmission state indicating apparatus 1 according to the embodiment completes the operations.

Figure 8B:
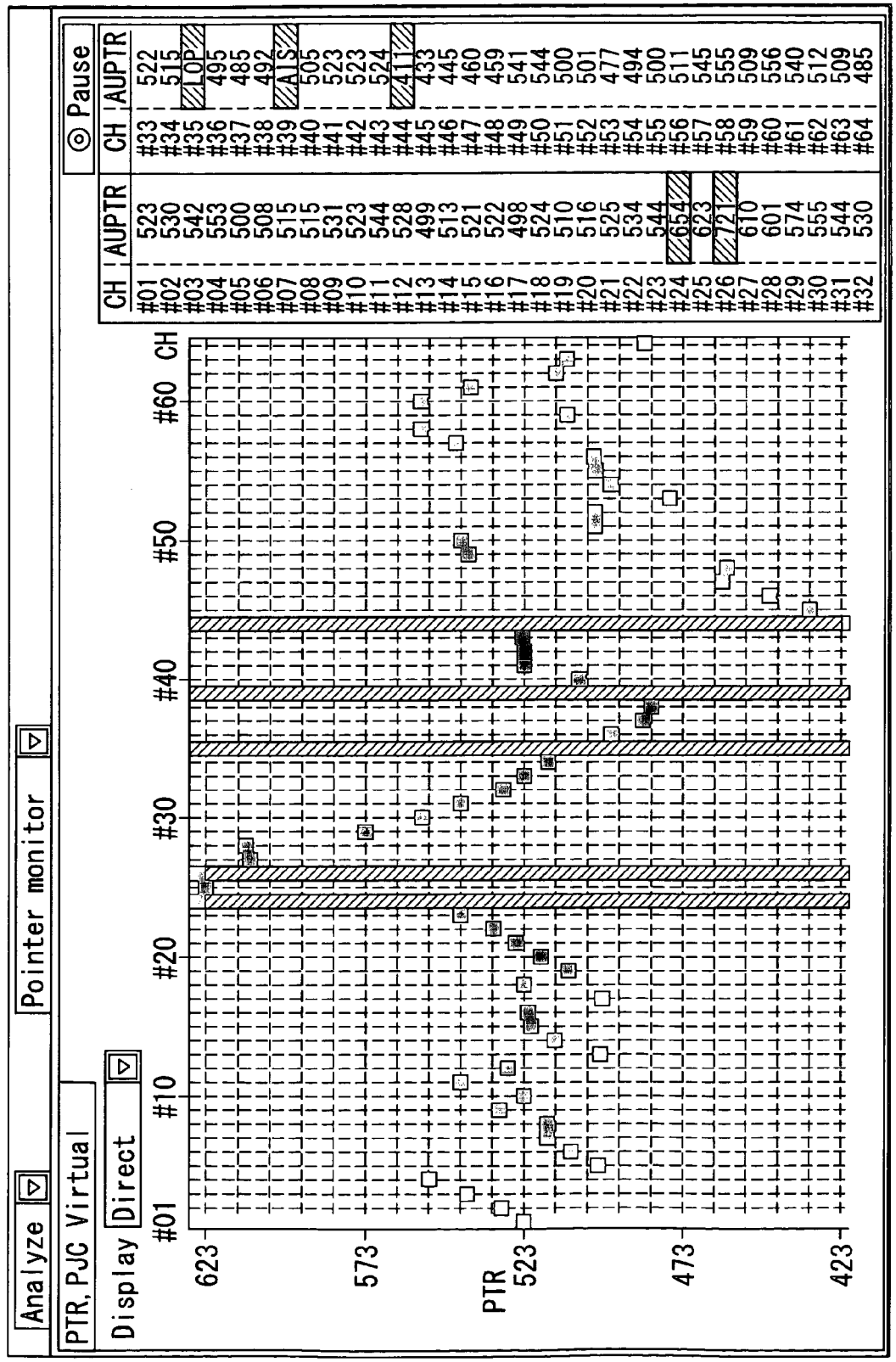
FIG. 8B is a schematic diagram showing a concrete example of the display screen of the transmission state indicating apparatus 1 of FIG. 1.

FIG. 8B is a schematic diagram showing, as a concrete example of the display screen of the transmission state indicating apparatus 1 of FIG. 1, a screen of a point monitor on which the values of the AU pointers from channel #01 to channel #64 are indicated in accordance with the respective channels, in case of mapping VC-4, for example.

This display screen is the screen at the time of directly indicating, and measured values by using Channel #01 as a reference value are indicated as are by a graphic-indication format and a table-indication format.

<Graphic-Indication>

Values measured by using Channel #01 as a reference value are indicated by ■s (navy blue).

When the measured value is over a threshold value, and LOP (Loss Of Pointer)/AIS (Alarm Indication Signal) arises, the ranges of the objective channels of the graph and the table are made to be red strips, and the ■s (navy blue) are made to be indications sticking to the highest point or the lowest point.

The PTR value at the middle of the graduation shows a pointer value of Channel #01, and is renewed by being interlocked with the values of the table at measured intervals.

The graduation of the abscissa of the #01 channel which is the reference is expressed by a gray solid line, and shows the reference line, and the other graduations are light gray dotted lines.

<Table-Indication>

Values measured by using Channel #01 as a reference value are indicated as are.

The background color of the portion of Channel #01 which is the reference is made to be yellow, and shows a channel which is the reference, and the background color of the other portions is made to be white.

However, when the measured value is over a threshold value, and LOP/AIS arises, the background color is made to be red.

There are cases in which the number of channels are little in cases of a bit rate and mapping, the configuration of the screen in this case is left as is, and the number of data of the number corresponding to the bit rate and mapping are indicated.

At the time of the SONET, the labeling AUPTR of the table changes to STSPTR.

As described above, in accordance with the transmission indicating apparatus 1 of the present embodiment, the respective frames transmitted via the communication network 3 having a plurality of channels are received by the plurality of frame receiving units 1A1, 1A2, . . . , 1A*n*. The values of the AU pointers at the virtual containers included in the received respective frames are detected and corrected from the insides of the respective frames by the H1/H2 bytes detecting unit 1E1 as pointer values showing the transmission states of the communication network. Further, the values of the AU pointers detected and corrected are indicated at the same time on the display screen of the display unit 1I corresponding to the respective channels. Therefore, the operator can visually verify the pointer values showing the transmission states of the communication network corresponding to the respective channels.

Further, in accordance with the transmission indicating apparatus 1 of the present embodiment, the values of the AU pointers at the respective channels detected and corrected by the H1/H2 bytes detecting unit 1E1 or the relative differences with respect to the reference channel are indicated. Accordingly, the operator can visually verify easily a transmission state such as how much a load is being applied to the transmission state indicating apparatus 1 itself, or the like, from the indicated pattern.

Furthermore, in accordance with the transmission indicating apparatus 1 of the present embodiment, not only the channel range as the AU pointer monitor can be enlarged, but also can be enlarged a range of indicating an abnormality of the AU pointers of the containers included in the received respective frames, by indicating variations in the values of the AU pointers corresponding to the respective channels.

Second Embodiment

Figure 9:
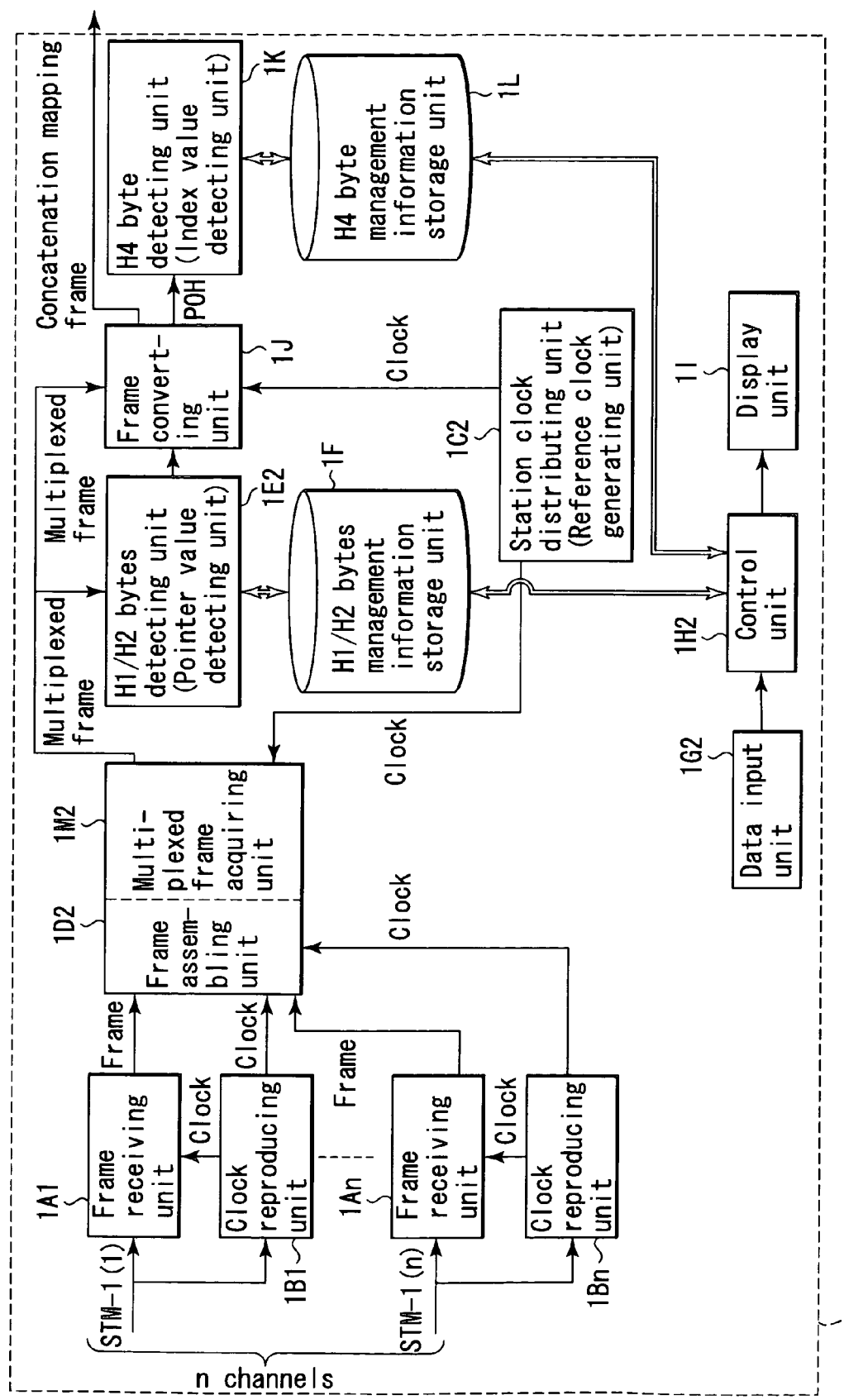
FIG. 9 is a block diagram showing a configuration example of a transmission state indicating apparatus 1' according to a second embodiment of the present invention.

FIG. 9 is a block diagram showing a configuration example of a transmission state indicating apparatus 1' according to a second embodiment of the present invention.

Note that, in FIG. 9, configurations which are the same as those of the first embodiment are denoted by the same reference numerals of FIG. 1, and detailed description thereof will be omitted, and portions which are different from those of the first embodiment will be mainly described hereinafter.

Note that the SDH transmitting apparatus of the SDH system according to the embodiment, as the SDH transmitting apparatus 2 as shown in FIG. 5, for example, has a function of adding consecutive numbers from 0 to 4095 to the H4 bytes of the POHs in the virtual containers of the VC-3 system or the VC-4 system included in the frames to be transmitted to the respective channels.

The transmission state indicating apparatus 1' according to the embodiment is configured such that a frame converting unit 1J, an H4 byte detecting unit (index detecting unit) 1K, and an H4 byte management information storage unit 1L are added to the configuration of the first embodiment described above. In addition, the station clock distributing unit 1C1 in the configuration of the first embodiment is replaced with an station clock distributing unit 1C2, the frame assembling unit 1D1 is replaced with a frame assembling unit 1D2, the multiplexed frame acquiring unit 1M1 is replaced with a multiplexed frame acquiring unit 1M2, the H1/H2 bytes detecting unit 1E1 is replaced with an H1/H2 bytes detecting unit 1E2, the data input unit 1G1 is replaced with a data input unit 1G2, and the control unit 1H1 is replaced with a control unit 1H2.

The station clock distributing unit 1C2 has, in addition to the functions which the station clock distributing unit 1C1 according to the first embodiment has, a function of preparing a clock in the transmission state indicating apparatus 1' and outputting the prepared clock to the frame converting unit 1J.

The frame assembling unit 1D2 has a function of carrying out mapping of the POHs and payloads of the virtual containers included in the respective frames received via the respective channels, on the multiplexed frame in the same way as the frame assembling unit 1D1 according to the first embodiment, and a function of respectively outputting the multiplexed frame on which the mapping has been carried out, to the H1/H2 bytes detecting unit 1E2 and the frame converting unit 1J via the multiplexed frame acquiring unit 1M2.

The H1/H2 bytes detecting unit 1E2 has a function of detecting the AU pointers at the respective channels which have been defined as H1/H2 bytes (accurately, the values which are 3×3×64 AU pointers called H1 (#01 to #64), H2 (#01 to #64), and H3 (#01 to #64) bytes), as shown in FIG. 4B at the 4$^{th}$ row of the SOH from the multiplexed frame acquired via the multiplexed frame acquiring unit 1M2; a function of detecting variations in phases from the differences between the clocks of the respective communication networks (n respective channels) reproduced by the plurality of clock reproducing units 1B1, 1B2, . . . , 1Bn and outputted from the frame assembling unit 1D2, and the clocks outputted by the station clock distributing unit 1C2, and correcting the values of the AU pointers at the respective channels, based on the detected variations in phases; a function of detecting channels from sequence numbers showing transmission channels in the respective frames; and a function of adding the detecting times of the variations in phases to the corrected values of the AU pointers and the detected channels, and causing the H1/H2 bytes management information storage unit 1F to store the combinations of the respective channels and the values of the AU pointers at the respective channels having the detecting times added thereto.

The frame converting unit 1J has a function of receiving the multiplexed frame acquired from the frame assembling unit 1D2 via the multiplexed frame acquiring unit 1M2, and converting the multiplexed frame into a concatenation mapping frame according to the rules of concatenation mapping; a function of outputting the POH received from the frame assembling unit 1D2 to the H4 byte detecting unit 1K in the process of converting to the concatenation mapping frame; and a function of outputting the concatenation mapping frame to the exterior.

The H4 byte detecting unit 1K has a function of detecting the values of the H4 bytes at the respective channels which are arranged in the POHs outputted from the frame converting unit 1J and which show a delayed amount; a function of detecting variations in phases from the differences between the clocks of the respective communication networks (n respective channels) reproduced by the plurality of clock reproducing units 1B1, 1B2, . . . , 1Bn and outputted from the frame assembling unit 1D2, and the clocks outputted by the station clock distributing unit 1C2, and correcting the detected values of the H4 bytes at the respective channels based on this detected variations in phases; a function of detecting channels from sequence numbers showing a transmission channel in a frame; and a function of adding the detecting times to the combinations of the corrected values of the H4 bytes and the detected channels, and causing the H4 byte management information storage unit 1L to store the combination of the values of the H4 bytes and the channels having the detecting times added thereto.

At the H4 byte management information storage unit 1L, the combinations of the corrected values of the H4 bytes, the detecting times when the H4 bytes have been detected, and the channels are correspondingly stored.

The data input unit 1G2 receives the normal data input, and has, in addition to the functions of the data input unit 1G1 of the first embodiment described above, a function of carrying out a request for indication of the H4 bytes by outputting the inputted detecting times to the control unit 1H2.

The control unit 1H2 has a function of determining whether or not there is a request for indication for indicating the values of the H4 bytes in accordance with whether or not the detecting time has been received from the data input unit 1G2; a function of, as a result of the determination, when it is determined that there is a request for indication of the H4 bytes; reading combinations of the values of the H4 bytes corresponding to the detecting times and the channels from the H4 byte management information storage unit 1L; a function of determining whether or not a reference channel is designated; a function of, as a result of the determination, when it is determined that the reference channel is designated, calculating relative differences between the values of the H4 bytes at the reference channel and the values of the H4 bytes at the respective channels; a function of indicating the calculated relative differences and the respective channels as points on a two-dimensional plane with being made to correspond to one another on the display unit 1I at the same time; a function of, as a result of the determination described above, when it is determined that the reference channel is not designated, indicating the values of the H4 bytes at the respective channels as points on a two-dimensional plane in accordance with the respective channels on the display unit 1I at the same time; a function of, when it is determined that there is no request for indication of the H4 bytes, carrying out the processings which are the same as steps ST1, ST2, ST10 of the first embodiment described above.

Note that, in the transmission state indicating apparatus 1' according to the embodiment, a memory having stored therein measured data of the values of the H4 bytes at the respective channels at the time of a test separately carried out in advance may be separately provided.

In this case, at the control unit 1H2, in addition to the respective functions described above, a function of reading the measured value data at the time of the test from the memory, a function of calculating relative differences between the values of the H4 bytes read from the H4 byte management information storage unit 1L and the measured data stored in the memory, and a function of indicating the calculated relative differences in accordance with the respective channels on the display unit 1I at the same time.

Note that, in the transmission state indicating apparatus 1' according to the embodiment, the H4 byte detecting unit 1K is provided behind the frame converting unit 1J. However, the present embodiment is not limited thereto, the H4 byte detecting unit 1K may be provided behind the frame receiving units 1A1, 1A2, . . . , 1An, and may be provided behind the H1/H2 bytes detecting unit 1E.

Further, in the transmission state indicating apparatus 1' according to the embodiment, the configuration thereof may be changed to a configuration in which a function of assembling frames is added to the frame converting unit 1J, and the frame assembling unit 1D2, the H1/H2 bytes detecting unit 1E2, and the H1/H2 bytes management information storage unit 1F are not provided therein.

Next, the operations of the transmission state indicating apparatus 1' according to the second embodiment configured as described above will be described with reference to FIG. 10.

Note that, from the standpoint of focusing the description on the point of the present invention, in the following description, only the processing of indication to be carried out by the control unit 1H2 of the transmission state indicating apparatus 1', i.e., the processing in which the values of the AU pointers at the respective channels stored in the H1/H2 bytes management information storage unit 1F are indicated corresponding to the respective channels at the same time, and the processing in which the values of the H4 bytes at the respective channels stored in the H4 byte management information storage unit 1L are indicated corresponding to the respective channels, as described above, will be described.

Figure 10:
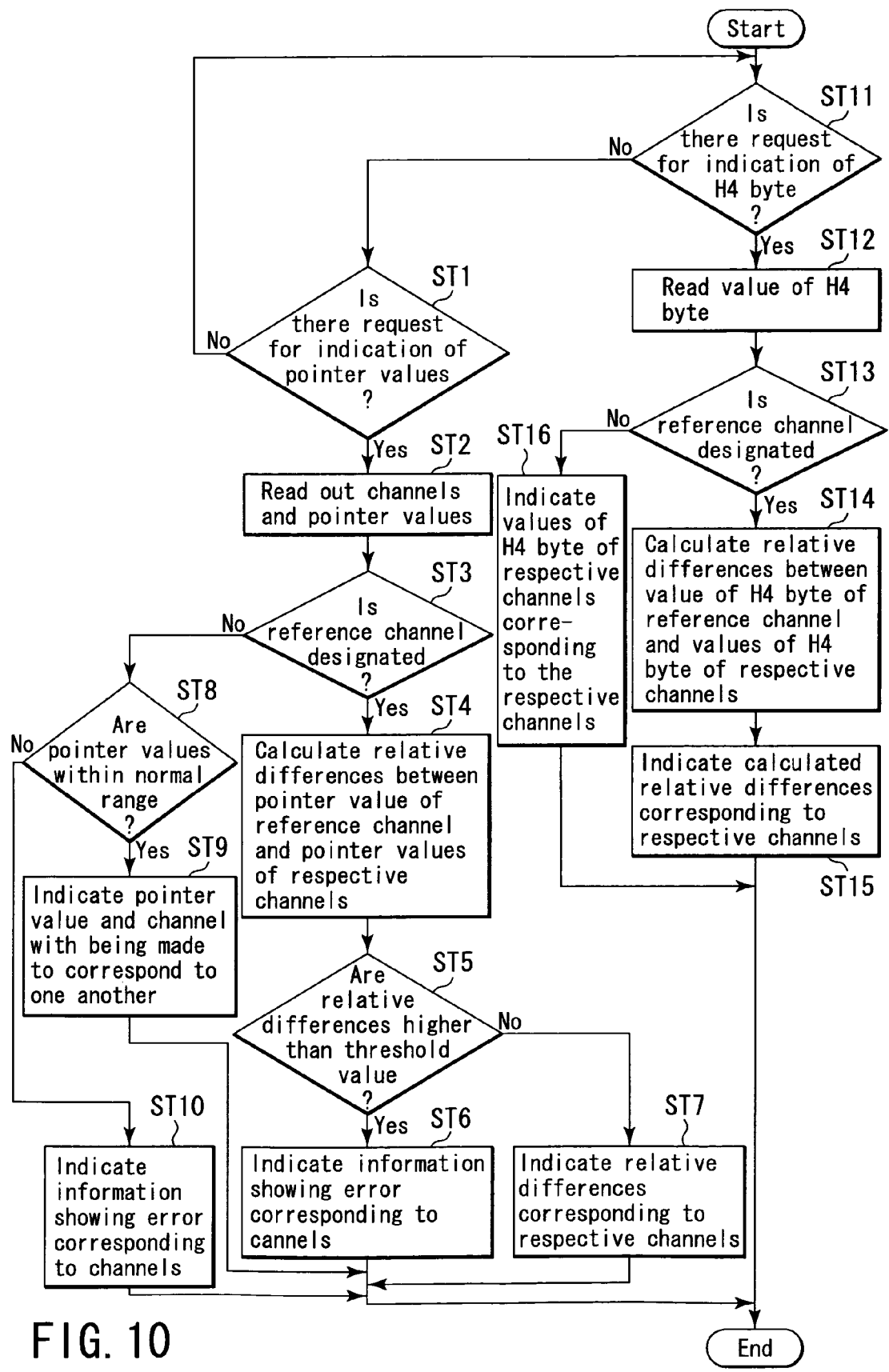
FIG. 10 is a flowchart for explanation of the operations of a control unit 1H2 of the transmission state indicating apparatus 1' of FIG. 9.

FIG. 10 is a flowchart for explanation of the operations of the control unit 1H2 of the transmission state indicating apparatus 1' according to the embodiment.

First, the control unit 1H2 determines whether or not there is a request for indication of the H4 bytes in accordance with whether or not the detecting time has been received from the data input unit 1G1 (step ST11).

When it is determined that a request for indication of the H4 bytes is carried out in step ST11 (step ST11: Yes), the control unit 1H2 reads the combinations of the value of the H4 byte corresponding to the detecting time and the channels from the H4 byte management information storage unit 1L (step ST12).

Next, the control unit 1H2 determines whether or not a reference channel is designated, in accordance with whether or not a reference channel has been received from the data input unit 1G2 (step ST13).

When it is determined that the reference channel is designated in step ST13 (step ST13: Yes), the control unit 1H2 calculates relative differences between the value of the H4 byte at the reference channel and the values of the H4 bytes at the respective channels (step ST14).

Next, the control unit 1H2 indicates the calculated relative differences and the respective channels with being made to correspond to one another, as points on a two-dimensional plane, on the display unit 1I at the same time (step ST15).

Figure 11:
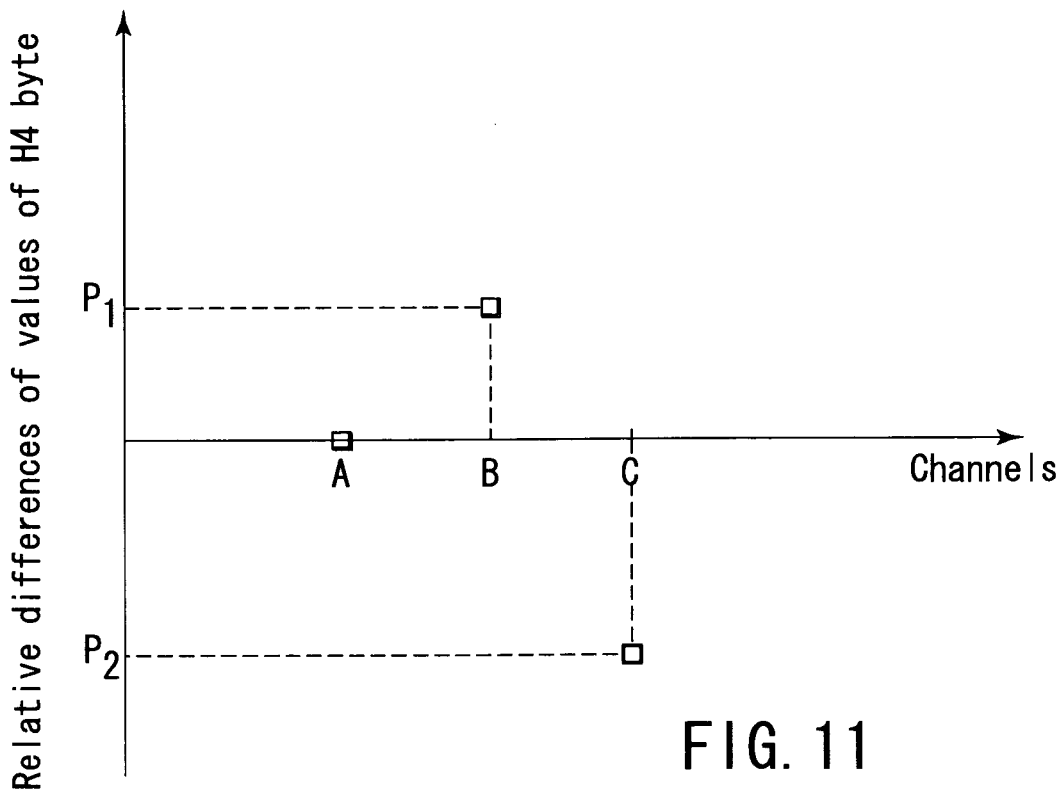
FIG. 11 is a schematic diagram showing one example of a display screen of the transmission state indicating apparatus 1' of FIG. 9.

FIG. 11 is a schematic diagram showing one example of the display screen of the display unit 1I in accordance with the transmission state indicating apparatus 1' according to the embodiment.

The abscissa of FIG. 11 shows the respective channels configuring the communication network, and the ordinate thereof shows the relative differences of the values of the H4 bytes in the POHs at the respective channels.

By the way, in the case of the example shown in FIG. 11, Channel A is the reference channel, and a relative difference between the value of the H4 byte at Channel B and the value of the H4 byte at the reference channel is P1 (a positive value).

Further, a relative difference between the value of the H4 byte at Channel C and the value-of the H4 byte at the reference channel is P2 (a negative value).

Note that, on the display screen of the display unit 1I in accordance with the transmission state indicating apparatus 1' according to the embodiment, a predetermine range is set with respect to the relative differences to the value of the H4 byte at the reference channel, and when the relative differences are not within the range, indications of alarms with strip lines in the same way as in the first embodiment may be carried out.

Furthermore, on the display screen of the display unit 1I in accordance with the transmission state indicating apparatus 1' according to the embodiment, the ordinate shows the relative differences between the values of the H4 bytes. However, because it can be thought of that the differences between the numeric values of the H4 bytes show the transmission delays between the respective channels configuring the communication network, the ordinate may show the time differences between the respective channels and the reference channel.

On the other hand, when it is determined that the reference channel has not been designated in step ST13 described above (step ST13: No), the control unit 1H2 indicates the values of the H4 bytes at the respective channels as points on a two-dimensional plane corresponding to the respective channels on the display unit 1I (step ST16).

Figure 12:
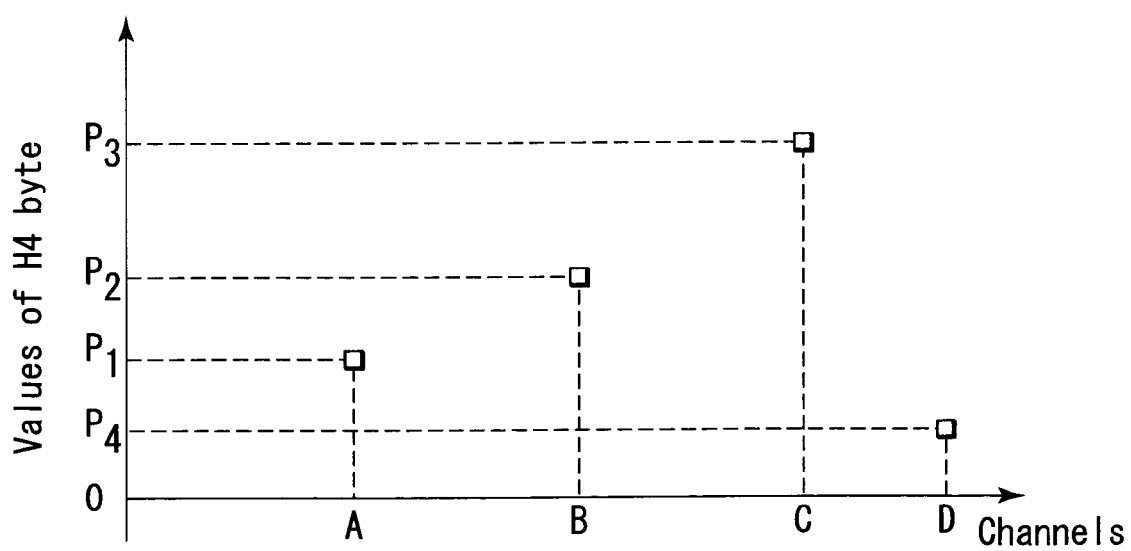
FIG. 12 is a schematic diagram showing another example of the display screen of the transmission state indicating apparatus 1' of FIG. 9.

FIG. 12 is a schematic diagram showing another example of the display screen of the display unit 1I in accordance with the transmission state indicating apparatus 1' according to the embodiment.

The abscissa of FIG. 12 shows the respective channels configuring the communication network, and the ordinate thereof shows the values of the H4 bytes in the POHs at the respective channels.

By the way, in the case of the example shown in FIG. 12, the value of the H4 byte at Channel A is P1, the value of the H4 byte at Channel B is P2, and the value of the H4 byte at Channel C is P3, and the value of the H4 byte at Channel D is P4.

Note that, on the display screen of the display unit 1I of the transmission state indicating apparatus 1' according to the embodiment, a predetermined threshold value is set with respect to the value of the H4 byte, and when the value of the H4 byte is over the threshold value, an indication of an alarm by a strip in the same way as in the first embodiment may be carried out.

Further, on the display screen of the display unit 1I of the transmission state indicating apparatus 1' according to the embodiment, the ordinate shows the values-of the H4 bytes. However, because it can be thought of that the differences between the numeric values of the H4 bytes show the transmission delays between the respective channels configuring the communication network, the ordinate may show the time.

On the other hand, when it is determined that there is no request for indication of the H4 bytes in step ST11 described above (step ST11: No), the control unit 1H2 carries out the processings which are the same as the steps ST1, ST2, ..., ST10 of the first embodiment described above.

Note that, in this case, it is supposed that, in the description of the steps ST1, ST2, ..., ST10 of the flowchart of the first embodiment described above, the "control unit 1H1" is read as "control unit 1H2", and the "data input unit 1G1" is read as "data input unit 1G2".

In accordance with a series of processings as described above, the transmission state indicating apparatus 1' completes the operations.

As described above, in accordance with the second embodiment of the present invention, because the values of the H4 bytes at the respective channels are indicated corresponding to the respective channels, in addition to the effects according to the first embodiment described above, an effect can be obtained in which the operator can visually verify the transmission delays between the respective channels.

Note that, in the above-described respective embodiments, there are cases in which the plurality of frame receiving units 1A1, 1A2, ..., 1An, the plurality of clock reproducing units 1B1, 1B2, ..., 1Bn, the frame assembling units 1D1 and 1D2, and the station clock distributing units 1C1 and 1C2 are installed in a standing manner in a relay station carrying out relay processing or the like at the communication network to which the transmission state indicating apparatuses 1 and 1' according to the invention are applied.

Accordingly, in such a case, the configurations of the transmission state indicating apparatuses 1 and 1' according to the first embodiment of the invention are configured from the multiplexed frame acquiring unit 1M1, the H1/H2 bytes detecting unit 1E1, the H1/H2 byte management information storage unit 1F, the data input unit 1G1, the control unit 1H1, and the display unit 1I, other than the plurality of frame receiving units 1A1, 1A2, ..., 1An, the plurality of clock reproducing units 1B1, 1B2, ..., 1Bn, the frame assembling units 1D1 and 1D2, and the station clock distributing units 1C1 and 1C2.

Further, the configurations of the transmission state indicating apparatuses 1 and 1' according to the second embodiment of the invention are configured from the multiplexed frame acquiring unit 1M2, the H1/H2-bytes detecting unit 1E2, the H1/H2 bytes management information storage unit 1F, the data input unit 1G2, the control unit 1H2, the frame converting unit 1J, the H4 byte detecting unit 1K, the H4 byte management information storage unit 1L, and the display unit 1I, other than the plurality of frame receiving units 1A1, 1A2, ..., 1An, the plurality of clock reproducing units 1B1, 1B2, ..., 1Bn, the frame assembling units 1D1 and 1D2, and the station clock distributing units 1C1 and 1C2.

Furthermore, the technique described in the above-described respective embodiments can be stored as a program which can be executed by computers in a recording medium such as a magnetic disk (a floppy disk, a hard disk, or the like), an optical disk (a CD-ROM, a DVD, or the like), a magneto optical disk (an MO), a semiconductor memory, or the like, and can be distributed.

Note that the program realizing the technique described in the above-described respective embodiments can be provided by being sent via a communication network, for example, Internet, Intranet, or Ethernet.

As a method for providing the program via the network, for example, a method by ASP (Application Service Provider) is included.

Moreover, provided that the program can realize the above-described functions, the program may be described in any programming language such as, for example, C (registered trademark), C++ (registered trademark), JAVA (registered trademark), or the like.

In addition, in the above-described embodiments, the inventions at various stages are included, the various inventions can be considered due to the plurality of structural requirements which have been disclosed being appropriately combined.

For example, in the case where the invention is considered due to some structural requirements being omitted from all of the structural requirements shown in the embodiment, when the considered invention is implemented, the omitted portions are appropriately compensated by well-known and common techniques.

Further, the respective embodiments may be implemented by as being appropriately combined with one another as possible, and in this case, the combined effects can be obtained.

As described above, according to the present invention, a transmission state indicating apparatus can be provided in which, in order to carry out stable data communication via an existing wire communication network having a plurality of channels using a transmission system by the virtual concatenation, for example, an SDH transmission system or the like, by indicating pointer values required for determining good or bad in a transmission state of the communication network which includes the transmission delayed-amount at the respective channels and the amounts of variations in phases due to the phase differences between the plurality of low capacity channel sides and the clock of the high capacity channel in accordance with the respective channels, as pointer values for evaluating the transmission states of the communication network, the operator can visually verify the pointer values showing the transmission states of the communication network while associating those with the respective channels.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transmission state indicating method for a predetermined transmission system, by SONET (Synchronous Optical Network)/SDH (Synchronous Digital Hierarchy), in which high capacity data is divided into a plurality of low capacity virtual containers and transmitted via a plurality of channels which configure a communication network by the SONET/SDH based on clocks at the respective channels, the method comprising:

assembling a plurality of frames back into a multiplexed frame, wherein the plurality of frames are received in accordance with transmission states at the respective channels, and wherein the assembling is performed based on a reference clock with respect to virtual containers at the respective channels included in the plurality of frames including the plurality of low capacity virtual containers;

successively detecting factors at the respective channels which are respectively included in the plurality of frames contained in the multiplexed frame, and which are to be objects for delay absorption processings corresponding to the transmission states at the respective channels, as a plurality of pointer values indicating a variation in phase or transmission delay during transmission at said plurality of channels which configure the communication network by the SONET/SDH; and indicating the plurality of pointer values successively detected, at the same time, corresponding to the plurality of channels by a graphic indication and a table indication, wherein in the graphic indication, a first axis indicates the plurality of channels which configure the communication network and a second axis indicates the pointer values of the plurality of channels contained in the frames, and wherein in the graphic indication and the table indication, when a pointer value of a given channel from the plurality of channels is judged to exceed a predetermined range with respect to a reference value and a LOP (Loss Of Pointer)/AIS (Alarm Indication Signal) has arisen, a pointer value plot range of the given channel indicated in the graphic indication is shaped into a strip and the pointer value of the given channel displayed in the table indication is made identifiable.

2. The transmission state indicating method according to claim 1, further comprising:
storing said plurality of pointer values in association with information for indicating said plurality of pointer values at the same time in accordance with said plurality of channels; and
reading out the plurality of pointer values stored in association with the information for indicating the plurality of pointer values corresponding to the plurality of channels, at the same time.

3. The transmission state indicating method according to claim 1, further comprising:
carrying out processing for indicating said plurality of pointer values by relative values with respect to a pointer value of a reference channel to be a reference among said plurality of channels when said plurality of pointer values are indicated at the same time corresponding to the plurality of channels.

4. The transmission state indicating method according to claim 1, wherein the plurality of pointer values include values of AU (Administrative Unit) pointers included in H1 bytes and H2 bytes which have been defined to show head portions of the virtual containers in case where the low capacity containers are contained in a payload, at the $4^{th}$ row of an SOH (Section Overhead) frame in which the plurality of frames are frames of an STM (Synchronous transfer mode) and which is added to the payload of the frame of the STM.

5. The transmission state indicating method according to claim 1, wherein the plurality of pointer values include a value of H4 byte which has been defined at the $6^{th}$ row of a POH (Pass Overhead) added to head portions of the respective virtual containers in case where said plurality of frames are frames of an STM (Synchronous transfer mode) and the virtual containers included in the frames of the STM are a VC-3 format or a VC-4 format.

6. The transmission state indicating method according to claim 1, wherein the plurality of pointer values include values of AU (Administrative Unit) pointers included in H1 bytes and H2 bytes which have been defined to show head portions of the virtual containers in case where the low capacity containers are contained in a payload, at the $4^{th}$ row of an SOH (Section Overhead) frame in which said plurality of frames are frames of an STM (Synchronous transfer mode) and which is added to the payload of the frame of the STM, and a value of H4 byte which has been defined at the $6^{th}$ row of a POH (Pass Overhead) added to the head portions of the respective virtual containers in case where said plurality of frames are frames of the STM (Synchronous transfer mode) and the virtual containers included in the frames of the STM are a VC-3 format or a VC-4 format.

7. The transmission state indicating method according to claim 1, further comprising:
converting the multiplexed frame into a concatenation mapping frame according to rules of concatenation mapping; and
detecting a plurality of index values included in the concatenation mapping frame converted according to the rules of the concatenation mapping in place of the multiplexed frame.

8. A transmission state indicating apparatus for a predetermined transmission system by SONET (Synchronous Optical Network)/SDH (Synchronous Digital Hierarchy), in which high capacity data is divided into a plurality of low capacity virtual containers and transmitted via a plurality of channels which configure a communication network by the SONET/SDH based on clocks at the respective channels, the apparatus comprising:

a frame assembling unit which assembles a plurality of frames back into a multiplexed frame, wherein the plurality of frames are received in accordance with transmission states at the respective channels, and wherein the assembling by the frame assembling unit is performed based on a reference clock with respect to the virtual containers at the respective channels included in the plurality of frames including said plurality of low capacity virtual containers;

a pointer value detecting unit which successively detects factors at the respective channels that are respectively included in the plurality of frames included in the multiplexed frame assembled by the frame assembling unit, and that are to be objects for delay absorption processings corresponding to the transmission states at the respective channels, as a plurality of pointer values indicating a variation in phase or transmission delay during transmission at the plurality of channels which configure the communication network by the SONET/SDH; and a display unit which indicates the plurality of pointer values successively detected by the pointer value detecting unit, at the same time, corresponding to the plurality of channels by a graphic indication and a table indication, wherein in the graphic indication, a first axis indicates the plurality of channels which configure the communication network, and a second axis indicates the pointer values of the plurality of channels contained in the frames, and wherein in the graphic indication and the table indication, when a pointer value of a given channel from the plurality of channels is judged to exceed a predetermined range with respect to a reference value, and a LOP (Loss Of Pointer)/AIS (Alarm Indication Signal) has arisen, a pointer value plot range of the given channel indicated in the graphic indication is shaped into a strip and the pointer value of the given channel displayed in the table indication is made identifiable.

9. The transmission state indicating apparatus according to claim 8, further comprising:
a storage unit which stores said plurality of pointer values successively detected by the pointer value detecting unit in association with information for indicating the plurality of pointer values at the same time in accordance with the plurality of channels; and
a control unit which reads said plurality of pointer values stored in association with the information for indicating said plurality of pointer values corresponding to the plurality of channels at the storage unit, at the same time.

10. The transmission state indicating apparatus according to claim 8, further comprising:
a control unit which carries out processing for indicating the plurality of pointer values successively detected by the pointer value detecting unit, by relative values with respect to a pointer value of a reference channel to be a reference among the plurality of channels in the case where said plurality of pointer values are indicated at the same time corresponding to the said plurality of channels.

11. The transmission state indicating apparatus according to claim 8, wherein the plurality of pointer values include values of AU (Administrative Unit) pointers included in H1 bytes and H2 bytes which have been defined to show head portions of the virtual containers in case where the low capacity containers are contained in a payload, at the $4^{th}$ row of an SOH (Section Overhead) frame in which the plurality of frames are frames of an STM (Synchronous transfer mode) and are added to payloads of the frames of the STM.

12. The transmission state indicating apparatus according to claim 8, wherein the plurality of pointer values include a value of H4 byte which has been defined at the $6^{th}$ row of a POH (Pass Overhead) added to head portions of the respective virtual containers in case where the plurality of frames are frames of an STM (Synchronous transfer mode) and the virtual containers included in the frames of the STM system are a VC-3 format or a VC-4 format.

13. The transmission state indicating apparatus according to claim 8, wherein the plurality of pointer values include values of AU (Administrative Unit) pointers included in H1 bytes and H2 bytes which have been defined to show head portions of the virtual containers in case where the low capacity containers are contained in a payload, at the $4^{th}$ row of an SOH (Section Overhead) frame in which said plurality of frames are frames of an STM (Synchronous transfer mode) and are added to the payload of the frame of the STM, and a value of H4 byte which has been defined at the $6^{th}$ row of a POH (Pass Overhead) added to the head portions of the respective virtual containers when the plurality of frames are frames of the STM (Synchronous transfer mode) and the virtual containers included in the frames of the STM are a VC-3 format or a VC-4 format.

14. The transmission state indicating apparatus according to claim 8, further comprising:
   a frame converting unit which converts the multiplexed frame assembled by the frame assembling unit into a concatenation mapping frame according to rules of concatenation mapping; and
   an index value detecting unit which detects a plurality of index values included in the concatenation mapping frame converted according to the rules of the concatenation mapping by the frame converting unit.

15. A transmission state indicating apparatus for a predetermined transmission system by SONET (synchronous Optical Network)/SDH (synchronous digital Hierarchy), in which high capacity data is divided into a plurality of low capacity virtual containers and transmitted via a plurality of channels which configure a communication network by the SONET/SDH based on clocks at the respective channels, the apparatus comprising:
   a plurality of clock reproducing units which reproduce the clocks of the respective channels from reception signals of a plurality of frames including the plurality of low capacity virtual containers;
   a plurality of frame receiving units which receive the plurality of frames including the plurality of low capacity virtual containers in which the high capacity data is divided into the plurality of low capacity virtual containers and transmitted via the plurality of channels which configure the communication network by the SONET/SDH, corresponding to the plurality of the respective channels, and detect the virtual containers at the respective channels based on the clocks of the respective channels reproduced by the plurality of clock reproducing units;
   a reference clock generating unit which generates a reference clock;
   a frame assembling unit which assembles the plurality of frames back into a multiplexed frame in accordance with transmission states of the respective channels and based on the reference clock from the reference clock generating unit with respect to the virtual containers at the respective channels included in the plurality of the frames received corresponding to the plurality of channels by the plurality of frame receiving units;
   a pointer value detecting unit which successively detects factors at the respective channels that are respectively included in the plurality of frames contained in the multiplexed frame assembled by the frame assembling unit, and that are to be objects for delay absorption processings corresponding to the transmission states at the respective channels, as a plurality of pointer values indicating a variation in phase or transmission delay during transmission at the plurality of channels which configure the communication network by the SONET/SDH, and which successively detects the plurality of pointer values based on variations in phases at the respective channels to be detected from phase differences between the clocks at the respective channels reproduced by the plurality of clock reproducing units and the reference clock generated by the reference clock generating unit;
   an information storage unit which stores the plurality of pointer values successively detected by the pointer value detecting unit in association with information for indicating the plurality of pointer values in accordance with the plurality of channels; and
   a display unit which indicates, at the same time by a graphic indication and a table indication, the plurality of pointer values for respectively evaluating the transmission states of the plurality of channels which configure the communication network by the SONET/SDH, corresponding to the plurality of channels, based on the plurality of pointer values and the information for indicating the plurality of pointer values corresponding to the plurality of channels which have been stored in association with one another in the information storage unit,
   wherein in the graphic indication, a first axis indicates the plurality of channels which configure the communication network, and a second axis indicates the pointer values of the plurality of channels contained in the frames, and wherein in the graphic indication and the table indication, when a pointer value of a given channel from the plurality of channels indicated is judged to exceed a predetermined range with respect to a LOP (Loss Of Pointer)/AIS (Alarm Indication Signal) has arisen, a pointer value plot range of the given channel indicated in the graphic indication is shaped into a strip and the pointer value of the given channel displayed in the table indication is made identifiable.

16. The transmission state indicating apparatus according to claim 15, further comprising:
   a control unit which carries out processing for indicating the plurality of pointer values by relative values with respect to a pointer value of a reference channel to be a reference among the plurality of channels on the display unit.

17. The transmission state indicating apparatus according to claim 15, wherein the plurality of pointer values include values of AU (Administrative Unit) pointers included in H1 bytes and H2 bytes which have been defined to show head portions of the virtual containers in case where the low capacity containers are contained in a payload, at the $4^{th}$ row of an SOH (Section Overhead) frame in which the plurality of frames are frames of an STM (Synchronous transfer mode) and are added to the payload of the frame of the STM.

18. The transmission state indicating apparatus according to claim 15, wherein the plurality of pointer values include a value of H4 byte which has been defined at the $6^{th}$ row of a POH (Pass Overhead) added to head portions of the respective virtual containers in case where the plurality of frames are frames of an STM (Synchronous transfer mode) and the virtual containers included in the frames of the STM are a VC-3 format or a VC-4 format.

19. The transmission state indicating apparatus according to claim 15, wherein the plurality of pointer values include values of AU (Administrative Unit) pointers included in H1 bytes and H2 bytes which have been defined to show head portions of the virtual containers in case where the low capacity containers are contained in a payload, at the $4^{th}$ row of an SOH (Section Overhead) frame in which the plurality of frames are frames of an STM (Synchronous transfer mode) and are added to the payload of the frame of the STM, and a value of H4 byte which has been defined at the $6^{th}$ row of a POH (Pass Overhead) added to the head portions of the respective virtual containers in case where said plurality of frames are frames of the STM (Synchronous transfer mode) and the virtual containers included in the frames of the STM are a VC-3 format or a VC-4 format.

20. The transmission state indicating apparatus according to claim 15, further comprising:
  a frame converting unit which converts the multiplexed frame assembled by the frame assembling unit into a concatenation mapping frame according to rules of concatenation mapping; and
  an index value detecting unit which detects a plurality of index values included in the concatenation mapping frame converted according to the rules of the concatenation mapping by the frame converting unit.

* * * * *